United States Patent
Kim et al.

(10) Patent No.: US 10,882,939 B2
(45) Date of Patent: Jan. 5, 2021

(54) METHOD FOR PREPARING MODIFIED CONJUGATED DIENE-BASED POLYMER

(71) Applicant: LG Chem, Ltd., Seoul (KR)

(72) Inventors: Jin Young Kim, Daejeon (KR); Jun Seok Ko, Daejeon (KR); No Ma Kim, Daejeon (KR); Yu Jin Kim, Daejeon (KR); Ki Seok Son, Daejeon (KR); Hae Sung Sohn, Daejeon (KR); Ro Mi Lee, Daejeon (KR); Sang Mi Lee, Daejeon (KR); Tae Chui Lee, Daejeon (KR); He Seung Lee, Daejeon (KR)

(73) Assignee: LG Chem, Ltd.

( * ) Notice: Subject to any disclaimer, the term of this patent is extended or adjusted under 35 U.S.C. 154(b) by 135 days.

(21) Appl. No.: 16/342,124

(22) PCT Filed: Dec. 7, 2017

(86) PCT No.: PCT/KR2017/014322
§ 371 (c)(1),
(2) Date: Apr. 15, 2019

(87) PCT Pub. No.: WO2018/128285
PCT Pub. Date: Jul. 12, 2018

(65) Prior Publication Data
US 2019/0256635 A1    Aug. 22, 2019

(30) Foreign Application Priority Data

Jan. 3, 2017 (KR) .................. 10-2017-0000747
Jul. 31, 2017 (KR) .................. 10-2017-0097143

(51) Int. Cl.
*C08F 236/10*    (2006.01)
*C08F 2/01*    (2006.01)
(Continued)

(52) U.S. Cl.
CPC ........... *C08F 236/10* (2013.01); *C08C 19/22* (2013.01); *C08C 19/25* (2013.01); *C08C 19/44* (2013.01);
(Continued)

(58) Field of Classification Search
CPC ......... C08F 236/10; C08F 2/001; C08F 2/38; C08F 36/04; C08F 36/06; C08F 36/08;
(Continued)

(56) References Cited

U.S. PATENT DOCUMENTS 4,397,994 A    8/1983    Takeuchi et al.
5,770,660 A    6/1998    Lightsey
(Continued)

FOREIGN PATENT DOCUMENTS

EP    3059257 A1    8/2016
EP    3059258 A1    8/2016
(Continued)

OTHER PUBLICATIONS

Search report from International Application No. PCT/KR2017/014322, dated May 1, 2018.
(Continued)

*Primary Examiner* — William K Cheung
(74) *Attorney, Agent, or Firm* — Lerner, David, Littenberg, Krumholz & Mentlik, LLP

(57) ABSTRACT

The present invention relates to a method for preparing a modified conjugated diene-based polymer, and more particularly, provides a method for preparing a modified conjugated diene-based polymer including a step of polymerizing a conjugated diene-based monomer in the presence of an organometal compound in a hydrocarbon solvent to prepare an active polymer which is coupled with an organometal (S1); and a step of reacting or coupling the active polymer prepared in step (S1) with a modifier (S2), wherein
(Continued)

step (S1) is continuously performed in two or more polymerization reactors, and a polymerization conversion ratio in a first reactor among the polymerization reactors is 50% or less.

19 Claims, 3 Drawing Sheets

(51) Int. Cl.
| | |
|---|---|
| *C08F 36/06* | (2006.01) |
| *C08F 36/08* | (2006.01) |
| *C08F 36/16* | (2006.01) |
| *C08K 3/36* | (2006.01) |
| *C08K 5/06* | (2006.01) |
| *C08K 5/17* | (2006.01) |
| *C08F 36/04* | (2006.01) |
| *C08F 2/38* | (2006.01) |
| *C08C 19/44* | (2006.01) |
| *C08C 19/25* | (2006.01) |
| *C08C 19/22* | (2006.01) |
| *C08F 2/00* | (2006.01) |
| *C08K 5/1535* | (2006.01) |
| *C08K 5/544* | (2006.01) |

(52) U.S. Cl.
CPC ............... *C08F 2/001* (2013.01); *C08F 2/38* (2013.01); *C08F 36/04* (2013.01); *C08F 36/06* (2013.01); *C08F 36/08* (2013.01); *C08F 36/16* (2013.01); *C08K 3/36* (2013.01); *C08K 5/06* (2013.01); *C08K 5/1535* (2013.01); *C08K 5/17* (2013.01); *C08K 5/5442* (2013.01); *C08F 2438/00* (2013.01); *C08F 2500/01* (2013.01); *C08F 2500/05* (2013.01)

(58) Field of Classification Search
CPC .. C08F 36/16; C08F 2438/00; C08F 2500/01; C08F 2500/05; C08C 19/22; C08C 19/25; C08C 19/44; C08K 3/36; C08K 5/06; C08K 5/1535; C08K 5/17; C08K 5/5442
USPC .......................................................... 526/66
See application file for complete search history.

(56) References Cited

U.S. PATENT DOCUMENTS 6,444,762 B1* 9/2002 Fischer .................. C08F 4/44
502/157
2012/0277369 A1* 11/2012 Yoshida ................. C08F 36/04
524/575
2015/0045474 A1 2/2015 Lee et al.
2015/0086735 A1 3/2015 Valenti et al.
2016/0009903 A1* 1/2016 Morita .................... C08C 19/25
525/332.9
2016/0053059 A1 2/2016 Kim et al.
2016/0060368 A1 3/2016 Doring et al.
2016/0159957 A1 6/2016 Choi et al.
2016/0177011 A1 6/2016 Kim et al.
2016/0208023 A1 7/2016 Lee et al.
2016/0355612 A1 12/2016 Chun et al.
2016/0362504 A1 12/2016 Dire et al.
2017/0022298 A1 1/2017 Sohn et al.

FOREIGN PATENT DOCUMENTS

| | | |
|---|---|---|
| EP | 3070105 A1 | 9/2016 |
| EP | 3093297 A1 | 11/2016 |
| EP | 3101036 A1 | 12/2016 |
| EP | 3106469 A1 | 12/2016 |
| JP | H06271706 A | 9/1994 |
| JP | H11217465 A | 8/1999 |
| JP | 2000038423 A | 2/2000 |
| JP | 2015520789 A | 7/2015 |
| JP | 5896323 B2 | 3/2016 |
| JP | 5960903 B2 | 8/2016 |
| JP | 2016525626 A | 8/2016 |
| JP | 2016527359 A | 9/2016 |
| JP | 2016527370 A | 9/2016 |
| JP | 2016528369 A | 9/2016 |
| JP | 2017538788 A | 12/2017 |
| KR | 20120058564 A | 6/2012 |
| KR | 20140127716 A | 11/2014 |
| KR | 20150055025 A | 5/2015 |
| KR | 20150122142 A | 10/2015 |
| KR | 20150135913 A | 12/2015 |
| KR | 20150144130 A | 12/2015 |
| WO | 2011040312 A1 | 4/2011 |
| WO | 2014133096 A1 | 9/2014 |
| WO | 2016093496 A1 | 6/2016 |
| WO | 2016111445 A1 | 7/2016 |

OTHER PUBLICATIONS

Extended European Search Report for Application No. 17890009.8 dated Oct. 9, 2019, 3 pages.

* cited by examiner

METHOD FOR PREPARING MODIFIED CONJUGATED DIENE-BASED POLYMER

CROSS-REFERENCE TO RELATED APPLICATIONS

This application is a national phase entry under 35 U.S.C. § 371 of International Application No. PCT/KR2017/014322, filed Dec. 7, 2017, which claims priority to Korean Patent Application No. 10-2017-0000747, filed Jan. 3, 2017, and Korean Application No. 10-2017-0097143, filed Jul. 31, 2017, the disclosures of which are incorporated herein by reference.

TECHNICAL FIELD

The present invention relates to a method for preparing a modified conjugated diene-based polymer, and more particularly, to a method for preparing a modified conjugated diene-based polymer, which has excellent productivity and processability due to continuous polymerization and has narrow molecular weight distribution and good physical properties.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, the polymerization of SBR or BR may be performed by a batch type or a continuous type polymerization. By the batch type polymerization, the polymer thus prepared has narrow molecular weight distribution and is favorable in view of the improvement of physical properties, but has defects of low productivity and inferior processability. By the continuous type polymerization, polymerization is continuously performed, productivity is excellent, and it is favorable in view of improving processability, but molecular weight distribution is wide and physical properties are inferior. Thus, during preparing SBR or BR, research on improving productivity, processability and physical properties at the same time is consistently required.

PRIOR ART DOCUMENTS

Patent Documents (Patent Document 1) U.S. Pat. No. 4,397,994 A
(Patent Document 2) JP1994-271706 A

DISCLOSURE OF THE INVENTION

Technical Problem

The present invention has been devised to solve the above-mentioned defects of the conventional technique, and an object of the present invention is to provide a method for preparing a modified conjugated diene-based polymer which shows excellent productivity and processability by a continuous type polymerization, and has excellent physical properties such as tensile properties and excellent viscoelasticity.

Technical Solution

To solve the above-described tasks, according to an embodiment of the present invention, there is provided a method for preparing a modified conjugated diene-based polymer, including a step of polymerizing a conjugated diene-based monomer in the presence of an organometal compound in a hydrocarbon solvent to prepare an active polymer which is coupled with an organometal (S1); and a step of reacting or coupling the active polymer prepared in step (S1) with a modifier (S2), wherein step (S1) is continuously performed in two or more polymerization reactors, and a polymerization conversion ratio in a first reactor among the polymerization reactors is 50% or less.

Advantageous Effects

If a modified conjugated diene-based polymer is prepared according to the present invention, due to a continuous type polymerization, a modified conjugated diene-based polymer having excellent productivity and processability and equivalent or better degree of narrow molecular weight distribution as a modified conjugated diene-based polymer prepared by a batch type polymerization may be prepared. Thus, effect of preparing a modified conjugated diene-based polymer having excellent physical properties such as tensile properties and viscoelasticity properties may be achieved.

BRIEF DESCRIPTION OF THE DRAWINGS

The accompanying drawings in the present disclosure illustrate preferred embodiments of the present invention and are included together with the above description to provide a further understanding of the inventive concept. The inventive concept, however, should not be construed as limited to the accompanying drawings.

BEST MODE FOR CARRYING OUT THE INVENTION

Figure 1:
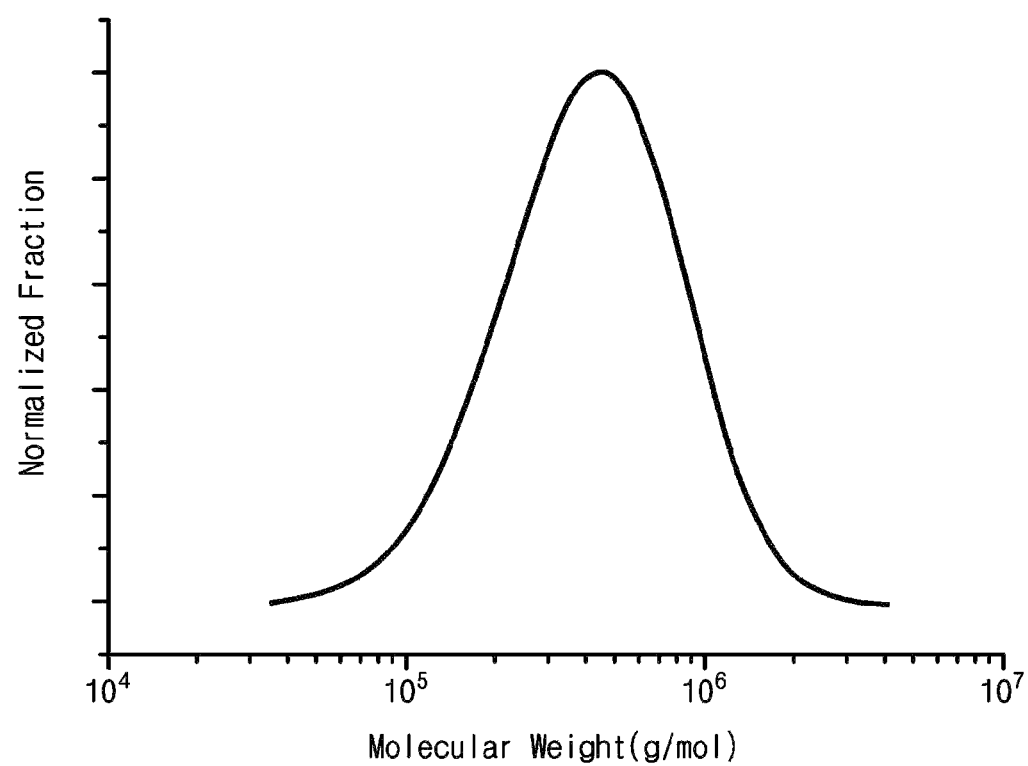
FIG. 1 illustrates a molecular weight distribution curve by gel permeation chromatography (GPC) of a modified conjugated diene-based polymer of Example 1 according to an embodiment of the present invention.

Hereinafter, the present invention will be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The method for preparing a modified conjugated diene-based polymer according to the present invention includes a step of polymerizing a conjugated diene-based monomer in the presence of an organometal compound in a hydrocarbon solvent to prepare an active polymer which is coupled with an organometal (S1); and a step of reacting or coupling the active polymer prepared in step (S1) with a modifier (S2), wherein step (S1) is continuously performed in two or more polymerization reactors, and a polymerization conversion ratio in a first reactor among the polymerization reactors is 50% or less.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-2,3-butadiene and 2-halo-1,3-butadiene (halo means a halogen atom).

The hydrocarbon solvent is not specifically limited and may be, for example, one or more selected from the group consisting of n-pentane, n-hexane, n-heptane, isooctane, cyclohexane, toluene, benzene and xylene.

According to an embodiment of the present invention, the organometal compound may be used from 0.01 mmol to 10 mmol, from 0.05 mmol to 5 mmol, from 0.1 mmol to 2 mmol, from 0.1 mmol to 1 mmol, or from 0.15 mmol to 0.8 mmol based on total 100 g of the monomer. The organometal compound may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be conducted by a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding an organometal compound, and the polymerization with heating means a polymerization method including injecting the organometal compound and increasing the temperature by optionally applying heat. The isothermal polymerization means a polymerization method by which the temperature of a polymer is kept constant by applying heat or taking heat after adding the organometal compound.

In addition, the polymerization of step (S1) may be conducted in a temperature range of 80° C. or less, −20° C. to 80° C., 0° C. to 80° C., 0° C. to 70° C., or 10° C. to 70° C., and in this range, the molecular weight distribution of a polymer is controlled narrow, and effect of excellent improvement of physical properties may be achieved.

The active polymer prepared by step (S1) may mean a polymer in which a polymer anion and an organometal cation are coupled.

Meanwhile, the polymerization of step (S1) may be performed by including an aromatic vinyl monomer, and in this case, the active polymer prepared by step (S1) may be an active copolymer obtained by copolymerizing a conjugated diene-based monomer and an aromatic vinyl monomer. The aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene, and 3-(2-pyrrolidino-1-methyl ethyl)-α-methylstyrene.

If the polymerization of step (S1) is performed by including an aromatic vinyl monomer, the aromatic vinyl monomer may be included in an amount of greater than 0 wt % to 90 wt % based on total 100 wt % of a conjugated diene-based monomer and an aromatic vinyl monomer. Within this range, effect of excellent rolling resistance and wet skid resistance and excellent balance between each of physical properties may be achieved. In a particular embodiment, the aromatic vinyl monomer may be included in an amount of greater than 0 wt % to 90 wt %, greater than 0 wt % to 50 wt %, or greater than 0 wt % to 40 wt % based on 100 wt % of a monomer mixture of a conjugated diene-based monomer and an aromatic vinyl monomer, and may be included in an amount of greater than 0 wt % to 10 wt %, from 10 wt % to less than 20 wt %, from 20 wt % to less than 30 wt %, or from 30 wt % to 45 wt % to control the physical properties of a polymer via the control of the amount of a conjugated diene-based monomer derived repeating unit or an aromatic vinyl monomer derived repeating unit in a polymer. In each of the ranges, effect of excellent rolling resistance or wet skid resistance may be achieved.

In addition, according to an embodiment of the present invention, the polymerization of step (S1) may be performed by further including a diene-based compound of 1 to 10 carbon atoms, and in this case, preventing effect of gel formation on the wall surface of a reactor during operating for a long time may be achieved. The diene-based compound may be, for example, 1,2-butadiene.

Meanwhile, if the polymerization of step (S1) is performed by further including a diene-based compound, the diene-based compound may be included in an amount of greater than 0 ppm to less than 200 ppm, greater than 0 ppm to 150 ppm, or greater than 0 ppm to 120 ppm based on 100 wt % of an amount of a monomer, or a mixture of a monomer mixture and a diene-based compound, particularly, a conjugated diene-based monomer, or a mixture of a monomer mixture of a conjugated diene-based monomer and an aromatic vinyl monomer and a diene-based compound. Within the range, preventing effect of gel formation on the wall surface of a reactor may be achieved without affecting the physical properties of a polymer.

According to an embodiment of the present invention, the active polymer prepared by step (S1) may be a random copolymer, and in this case, effect of excellent balance between each of physical properties may be achieved. The random copolymer may mean an arranged state of repeating units constituting a copolymer in disorder.

In another embodiment, the method for preparing a modified conjugated diene-based polymer may include, prior to step (S2), a step of injecting a conjugated diene-based monomer to the active polymer prepared by step (S1) to perform additional polymerization (S1'). By doing this prior to step (S2), the effect of substituting or end-capping the terminal of the active polymer with a conjugated diene-based monomer derived repeating unit may be achieved. The conjugated diene-based monomer which is injected in step (S1') may be greater than 0 parts by weight to 50 parts by weight, or greater than 0 parts by weight to 30 parts by weight with respect to 100 parts by weight of the conjugated diene-based monomer which is injected in step (S1). Within this range, effect of excellent reaction efficiency of step (S2) may be achieved.

According to an embodiment of the present invention, the method for preparing a modified conjugated diene-based polymer may be performed in a plurality of reactors including two or more polymerization reactors and a modification reactor by a continuous type polymerization method. In a particular embodiment, step (S1) may be performed continuously in two or more polymerization reactors including a first reactor, and the number of the polymerization reactor may be flexibly determined according to reaction conditions and environment. The continuous type polymerization method may mean reaction processes of continuously supplying reactants to a reactor and continuously discharging reaction products thus produced. By the continuous type polymerization method, effect of excellent productivity and processability, and excellent uniformity of the polymer thus prepared may be achieved.

In addition, according to an embodiment of the present invention, if the active polymer is continuously prepared in the polymerization reactor, a polymerization conversion ratio in the first reactor may be 50% or less, from 10% to 50%, or from 20% to 50%, and within this range, side reactions generated while forming a polymer after initiating polymerization reaction may be restrained and a polymer with a linear structure may be induced during polymerization. Thus, the molecular weight distribution of the polymer may be controlled narrow, and effect of excellent improvement of physical properties may be achieved.

In this case, the polymerization conversion ratio may be controlled according to the reaction temperature, the residence time in the reactor, etc.

The polymerization conversion ratio may be determined, for example, by measuring a solid concentration in a polymer solution phase including the polymer during polymerizing a polymer. In a particular embodiment, in order to secure the polymer solution, a cylinder type container is installed at the outlet of each polymerization reactor to fill a certain amount of the polymer solution in the cylinder type container. Then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to the following Mathematical Equation 1:

[Mathematical Equation 1]

$$\text{Polymer conversion ratio (\%)} = \frac{\text{Weight}(C)}{[(\text{Weight}(A) - \text{Weight}(B)) \times \text{total solid content of each reactor (wt \% } TSC)]}$$

Meanwhile, the polymer polymerized in the first reactor may be transported to a polymerization reactor before a modification reactor in order, and polymerization may be performed until the final polymerization conversion ratio becomes 95% or more. After performing the polymerization in the first reactor, the polymerization conversion ratio of the second reactor, or each reactor from the second reactor to the polymerization reactor before the modification reactor may be appropriately controlled to control molecular weight distribution.

Meanwhile, in step (S1), during preparing an active polymer, the residence time of a polymer in the first reactor may be from 1 minute to 40 minutes, from 1 minute to 30 minutes, or from 5 minutes to 30 minutes, and within this range, the control of a polymerization conversion ratio is favorable, and thus, the control of molecular weight distribution of a polymer narrow is possible, and effect of improving physical properties may be excellent.

The term "polymer" used in the present invention may mean an intermediate of a polymer type, which is under polymerization in each reactor during performing step (S1), after finishing step (S1) or step (S2), prior to obtaining an active polymer or a modified conjugated diene-based polymer, or may mean a polymer of a polymerization conversion ratio of less than 95%, which is under polymerization in a reactor.

According to an embodiment of the present invention, the molecular weight distribution (PDI, polydispersed index; MWD; Mw/Mn) of the active polymer prepared in step (S1) may be 1.5 or less, from 1.0 to less than 1.5, or from 1.1 to less than 1.5, and within this range, the molecular weight distribution of a modified conjugated diene-based polymer which is prepared via a modification reaction or coupling with a modifier is narrow, and improving effect of physical properties may be excellent.

Meanwhile, the polymerization of step (S1) may be performed by including a polar additive, and the polar additive may be added in an amount of 0.001 g to 50 g, 0.001 g to 10 g, or 0.005 g to 0.1 g based on total 100 g of the monomer. In another embodiment, the polar additive may be added in an amount of 0.001 g to 10 g, 0.005 g to 5 g, or 0.005 g to 4 g based on total 1 mmol of an organometal compound.

The polar additive may be, for example, one or more selected from the group consisting of tetrahydrofuran, 2,2-di(2-tetrahydrofuryl)propane, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium metholate, and 2-ethyl tetrahydrofufuryl ether, and may preferably be ditetrahydrofurylpropane, tetramethylene ethylenediamine, sodium metholate, or 2-ethyl tetrahydrofufuryl ether. If the polar additive is included, and if conjugated diene-based monomers, or a conjugated diene-based monomer and an aromatic vinyl-based monomer are copolymerized, the difference of their reaction rates may be compensated, and effect of inducing easy formation of a random copolymer may be achieved.

The modifier according to the present invention may be a modifier to modify the terminal of a conjugated diene-based polymer, and particularly, a modifier having an affinity with silica. The modifier having an affinity with silica may mean a modifier containing a functional group having an affinity with silica in a compound used as a modifier, and the functional group having an affinity with silica may mean a functional group having an excellent affinity with a filler, particularly, a silica-based filler, and enabling interaction between the silica-based filler and the modifier derived functional group.

The modifier may be, for example, an alkoxysilane-based modifier, and particularly, an alkoxysilane-based modifier including one or more heteroatoms such as a nitrogen atom, an oxygen atom, and a sulfur atom. If the alkoxysilane-based modifier is used, through the substitution reaction between an anionic active part positioned at one terminal of the active polymer and the alkoxy group of the alkoxysilane-based modifier, modification may be performed into a type in which the one terminal of the active polymer is coupled with a silyl group, and thus, affinity with an inorganic filler may be improved due to the functional group derived from the modifier, which is present at one terminal of a modified conjugated diene-based polymer, thereby achieving improving effect of the mechanical properties of a rubber composition including the modified conjugated diene-based polymer. Also, if the alkoxysilane-based modifier includes a nitrogen atom, increasing effect of additional physical properties derived from the nitrogen atom may be expectable in addition to the effect derived from the silyl group.

According to an embodiment of the present invention, the modifier may include a compound represented by the following Formula 1:

$$(R^4-R^{21})_n-N(-R^1-Si(OR^2)_a(R^3)_{3-a})_m$$ [Formula 1]

In Formula 1, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an alkyl group of 1 to 10 carbon atoms, a divalent, trivalent or tetravalent alkylsilyl group which is substituted with an alkyl group of 1 to 10 carbon atoms, or a heterocyclic group of 2 to 10 carbon atoms, $R^{21}$ may be a single bond, an alkylene group of 1 to 10 carbon atoms, or $-[R^{42}O]_j-$, where $R^{42}$ may be an alkylene group of 1 to 10 carbon atoms, and a and m may be each independently an integer selected from 1 to 3, n may be an integer of 0, 1, or 2, and j may be an integer selected from 1 to 30.

In a particular embodiment, in Formula 1, $R^1$ may be a single bond, or an alkylene group of 1 to 5 carbon atoms, $R^2$ and $R^3$ may be each independently hydrogen, or an alkyl group of 1 to 5 carbon atoms, $R^4$ may be hydrogen, an alkyl group of 1 to 5 carbon atoms, a tetravalent alkylsilyl group which is substituted with an alkyl group of 1 to 5 carbon atoms, or a heterocyclic group of 2 to 5 carbon atoms, $R^{21}$ may be a single bond, an alkylene group of 1 to 5 carbon atoms, or $-[R^{42}O]_j-$, where $R^{42}$ may be an alkylene group of 1 to 5 carbon atoms, and a may be an integer of 2 or 3, m may be an integer selected from 1 to 3, n may be an integer of 0, 1, or 2, where m+n=3 may be satisfied, and j may be an integer selected from 1 to 10.

In Formula 1, if $R^4$ is a heterocyclic group, the heterocyclic group may be unsubstituted or substituted with a trisubstituted alkoxysilyl group. If the heterocyclic group is substituted with a trisubstituted alkoxysilyl group, the substitution of the trisubstituted alkoxysilyl group may be performed by the connection thereof with the heterocyclic group via an alkylene group of 1 to 10 carbon atoms, and the trisubstituted alkoxysilyl group may mean an alkoxysilyl group which is substituted with an alkoxy group of 1 to 10 carbon atoms.

In a more particular embodiment, the compound represented by Formula 1 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, 3-(trimethoxysilyl)-N,N-diethylpropan-1-amine, 3-(triethoxysilyl)-N,N-diethylpropan-1-amine, tri(trimethoxysilyl)amine, tri-(3-(trimethoxysilyl)propyl)amine, N,N-bis(3-(diethoxy(methyl)silyl)propyl)-1,1,1-trimethylsilanamine, N,N-bis(3-(1H-imidazol-1-yl)propyl)-(triethoxysilyl)methan-1-amine, N-(3-(1H-1,2,4-triazole-1-yl)propyl)-3-(trimethoxysilyl)-N-(trimethoxysilyl)propyl) propan-1-amine, 3-(trimethoxysilyl)-N-(3-(trimethoxysilyl)propyl)-N-(3-(1-(3-(trimehtoxysilyl)propyl)-1H-1,2,4-triazol-3-yl)propyl)propan-1-amine, N,N-bis(2-(2-methoxyethoxy)ethyl)-3-(triethoxysilyl) propan-1-amine, N,N-bis(3-(triethoxysilyl)propyl)-2,5,8,11,14-pentaoxahexadecan-16-amine, N-(2,5,8,11,14-pentaoxahexadecan-16-yl)-N-(3-(triethoxysilyl)propyl)-2,5,8,11,14-pentaoxahexadecan-16-amine and N-(3,6,9,12-tetraoxahexadecyl)-N-(3-(triethoxysilyl)propyl)-3,6,9,12-tetraoxahexadecan-1-amine.

In another embodiment, the modifier may include a compound represented by the following Formula 2:

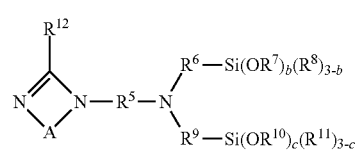

[Formula 2]

In Formula 2, $R^5$, $R^6$ and $R^9$ may be each independently an alkylene group of 1 to 10 carbon atoms, $R^7$, $R^8$, $R^{10}$ and $R^{11}$ may be each independently an alkyl group of 1 to 10 carbon atoms, $R^{12}$ may be hydrogen or an alkyl group of 1 to 10 carbon atoms, b and c may be each independently 0, 1, 2 or 3, where b+c≥1 may be satisfied, A may be

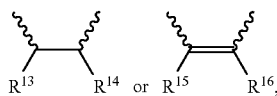

where $R^{13}$, $R^{14}$, $R^{15}$ and $R^{16}$ may be each independently hydrogen or an alkyl group of 1 to 10 carbon atoms.

In a particular embodiment, the compound represented by Formula 2 may be one selected from N-(3-(1H-imidazol-1-yl)propyl)-3-(triethoxysilyl)-N-(3-(triethoxysilyl)propyl)propan-1-amine and 3-(4,5-dihydro-1H-imidazol-1-yl)-N,N-bis(3-(triethoxysilyl)propyl)propan-1-amine.

In another embodiment, the modifier may include a compound represented by the following Formula 3:

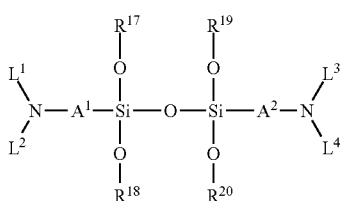

[Formula 3]

In Formula 3, $A^1$ and $A^2$ may be each independently a divalent hydrocarbon group of 1 to 20 carbon atoms, which includes or does not include an oxygen atom, $R^{17}$ to $R^{20}$ may be each independently a monovalent hydrocarbon group of 1 to 20 carbon atoms, $L^1$ to $L^4$ may be each independently a divalent, trivalent or tetravalent alkylsilyl group which is substituted with an alkyl group of 1 to 10 carbon atoms, or a monovalent hydrocarbon group of 1 to 20 carbon atoms, or $L^1$ and $L^2$, and $L^3$ and $L^4$ may be connected with each other to form a ring of 1 to 5 carbon atoms, where if $L^1$ and $L^2$, and $L^3$ and $L^4$ are connected with each other to form a ring, the ring thus formed may include one to three of one or more heteroatoms selected from the group consisting of N, O and S.

In a particular embodiment, in Formula 3, $A^1$ and $A^2$ may be each independently an alkylene group of 1 to 10 carbon atoms, $R^{17}$ to $R^{20}$ may be each independently an alkyl group of 1 to 10 carbon atoms, $L^1$ to $L^4$ may be each independently a tetravalent alkylsilyl group which is substituted with an alkyl group of 1 to 5 carbon atoms, or an alkyl group of 1 to 10 carbon atoms, or $L^1$ and $L^2$, and $L^3$ and $L^4$ may be connected with each other to form a ring of 1 to 3 carbon atoms, where if $L^1$ and $L^2$, and $L^3$ and $L^4$ are connected with each other to form a ring, the ring thus formed may include 1 to 3 atoms of one or more heteroatoms selected from the group consisting of N, O and S.

In a more particular embodiment, the compound represented by Formula 3 may be one selected from 3,3'-(1,1,3,3-tetramethoxydisiloxane-1,3-diyl)bis(N,N-dimethylpropan-1-amine, 3,3'-(1,1,3,3-tetraethoxydisiloxane-1,3-diyl)bis(N,N-dimethylpropan-1-amine, 3,3'-(1,1,3,3-tetrapropoxydisiloxane-1,3-diyl)bis(N,N-dimethylpropan-1-amine, 3,3'-(1,1,3,3-tetramethoxydisiloxane-1,3-diyl)bis(N,N-diethylpropan-1-amine, 3,3'-(1,1,3,3-tetramethoxydisiloxane-1,3-diyl)bis(N,N-dipropylpropan-1-amine, 3,3'-(1,1,3,3-tetraethoxydisiloxane-1,3-diyl)bis(N,N-diethylpropan-1-amine, 3,3'-(1,1,3,3-tetrapropoxydisiloxane-1,3-diyl)bis(N,N-diethylpropan-1-amine, 3,3'-(1,1,3,3-tetraethoxydisiloxane-1,3-diyl)bis(N,N-dipropylpropan-1-amine, 3,3'-(1,1,3,3-tetrapropoxydisiloxane-1,3-diyl)bis(N,N-dipropylpropan-1-amine, 3,3'-(1,1,3,3-tetramethoxydisiloxane-1,3-diyl)bis(N,N-diethylmethan-1-amine, 3,3'-(1,1,3,3-tetraethoxydisiloxane-1,3-diyl)bis(N,N-diethylmethan-1-amine, 3,3'-(1,1,3,3-tetrapropoxydisiloxane-1,3-diyl)bis(N,N-diethylmethan-1-amine, 3,3'-(1,1,3,3-tetramethoxydisiloxane-1,3-diyl)bis(N,N-dimethylmethan-1-amine, 3,3'-(1,1,3,3-tetramethoxydisiloxane-1,3-diyl)bis(N,N-dipropylmethan-1-amine, 3,3'-(1,1,3,3-tetrapropoxydisiloxane-1,3-diyl)bis(N,N-dimethylmethan-1-amine, 3,3'-(1,1,3,3-tetrapropoxydisiloxane-1,3-diyl)bis(N,N-dipropylmethan-1-amine, 3,3'-(1,1,3,3-tetraethoxydisiloxane-1,3-diyl)bis(N,N-dimethylmethan-1-amine, 3,3'-(1,1,3,3-tetraethoxydisiloxane-1,3-diyl)bis(N,N-dipropylmethan-1-amine, N,N'-((1,1,3,3-tetramethoxydisiloxane-1,3-diyl)bis(propan-3,1-diyl))bis(1,1,1-trimethyl-N-(trimethylsilyl)silanamine, N,N'-((1,1,3,3-tetraethoxydisiloxane-1,3-diyl)bis(propan-3,1-diyl))bis(1,1,1-trimethyl-N-(trimethylsilyl)silanamine, N,N'-((1,1,3,3-tetrapropoxydisiloxane-1,3-diyl)bis(propan-3,1-diyl))bis(1,1,1-trimethyl-N-(trimethylsilyl)silanamine, N,N'-((1,1,3,3-tetramethoxydisiloxane-1,3-diyl)bis(propan-3,1-diyl))bis(1,1,1-trimethyl-N-phenylsilanamine, N,N'-((1,1,3,3-tetraethoxydisiloxane-1,3-diyl)bis(propan-3,1-diyl))bis(1,1,1-trimethyl-N-phenylsilanamine, N,N'-((1,1,3,3-tetrapropoxydisiloxane-1,3-diyl)bis(propan-3,1-diyl))bis(1,1,1-trimethyl-N-phenylsilanamine, 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

In another embodiment, the modifier may include a compound represented by the following Formula 4:

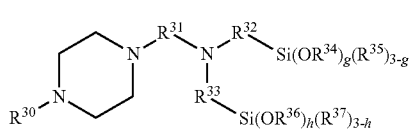

[Formula 4]

In Formula 4, $R^{30}$ may be a monovalent hydrocarbon group of 1 to 30 carbon atoms, $R^{31}$ to $R^{33}$ may be each independently an alkylene group of 1 to 10 carbon atoms, $R^{34}$ to $R^{37}$ may be each independently an alkyl group of 1 to 10 carbon atoms, and g and h may be each independently 0 or an integer selected from 1 to 3, where g+h is an integer of 1 or more.

In another embodiment, the modifier may include a compound represented by the following Formula 5:

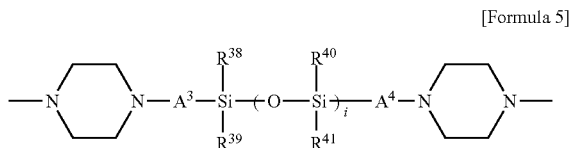

[Formula 5]

In Formula 5, $A^3$ and $A^4$ may be each independently an alkylene group of 1 to 10 carbon atoms, $R^{38}$ to $R^{41}$ may be each independently an alkyl group of 1 to 10 carbon atoms, or an alkoxy group of 1 to 10 carbon atoms, and i may be an integer selected from 1 to 30.

In another embodiment, the modifier may include one or more selected from 3,4-bis(2-methoxyethoxy)-N-(4-(trimethylsilyl)butyl)aniline, N,N-diethyl-3-(7-methyl-3,6,8,11-tetraoxa-7-silatridecan-7-yl)propan-1-amine, 2,4-bis(2-methoxyethoxy)-6-((trimethylsilyl)methyl)-1,3,5-triazine and 3,13-dimethoxy-3,8,8,13-tetramethyl-2,14-dioxa-7,9-dithia-3,8,13-trisilapentadecane.

In another embodiment, the modifier may include a compound represented by the following Formula 6:

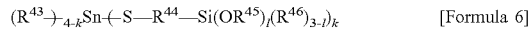
[Formula 6]

In Formula 6, $R^{43}$, $R^{45}$ and $R^{46}$ may be each independently an alkyl group of 1 to 10 carbon atoms, $R^{44}$ may be an alkylene group of 1 to 10 carbon atoms, and k may be an integer selected from 1 to 4.

In a more particular embodiment, the compound represented by Formula 6 may be one selected from 8,8-dibutyl-3,13-dimethoxy-3,13-dimethyl-2,14-dioxa-7,9-dithia-3,13-disila-8-stannapentadecane, 8,8-dimetyl-3,13-dimethoxy-3,13-dimethyl-2,14-dioxa-7,9-dithia-3,13-disila-8-stannapentadecane, 8,8-dibutyl-3,3,13,13-tetramethoxy-2,14-dioxa-7,9-dithia-3,13-disila-8-stannapentadecane and 8-butyl-3,3,13,13-tetramethoxy-8-((3-(trimethoxysilyl)propyl)thio)-2,14-dioxa-7,9-dithia-3,13-disila-8-stannapentadecane.

In another embodiment, the modifier may include a compound represented by the following Formula 7:

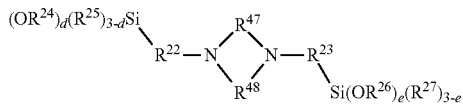
[Formula 7]

In Formula 7, $R^{22}$ and $R^{23}$ may be each independently an alkylene group of 1 to 20 carbon atoms, or $-R^{28}[OR^{29}]_f-$, $R^{24}$ to $R^{27}$ may be each independently an alkyl group of 1 to 20 carbon atoms or an aryl group of 6 to 20 carbon atoms, $R^{28}$ and $R^{29}$ may be each independently an alkylene group of 1 to 20 carbon atoms, $R^{47}$ and $R^{48}$ may be each independently a divalent hydrocarbon group of 1 to 6 carbon atoms, d and e may be each independently 0, or an integer selected from 1 to 3, where d+e is an integer of 1 or more, and f may be an integer of 1 to 30.

Particularly, in Formula 7, $R^{22}$ and $R^{23}$ may be each independently an alkylene group of 1 to 10 carbon atoms, or $-R^{28}[OR^{29}]_f-$, $R^{24}$ to $R^{27}$ may be each independently an alkyl group of 1 to 10 carbon atoms, $R^{28}$ and $R^{29}$ may be each independently an alkylene group of 1 to 10 carbon atoms, d and e may be each independently 0, or an integer selected from 1 to 3, where d+e is an integer of 1 or more, and f may be an integer selected from 1 to 30.

More particularly, the compound represented by Formula 7 may be a compound represented by the following Formula 7a, Formula 7b, or Formula 7c:

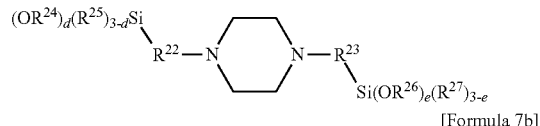
[Formula 7a]

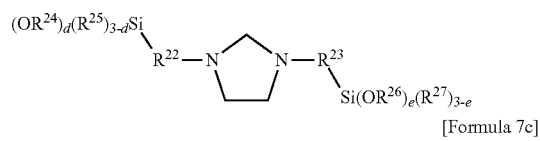
[Formula 7b]

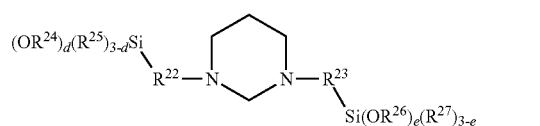
[Formula 7c]

In Formula 7a, Formula 7b, and Formula 7c, $R^{22}$ to $R^{27}$, d, and e are the same as described above.

In a more particular embodiment, the compound represented by Formula 7 may be one selected from 1,4-bis(3-(3-(triethoxysilyl)propoxy)propyl)piperazine, 1,4-bis(3-(triethoxysilyl)propyl)piperazine, 1,4-bis(3-(trimethoxysilyl)propyl)piperazine, 1,4-bis(3-(dimethoxymethylsilyl)propyl)piperazine, 1-(3-(ethoxydimethyllsilyl)propyl)-4-(3-(triethoxysilyl)propyl)piperazine, 1-(3-(ethoxydimethyl)propyl)-4-(3-(triethoxysilyl)methyl)piperazine, 1-(3-(ethoxydimethyl)methyl)-4-(3-(triethoxysilyl)propyl)piperazine, 1,3-bis(3-(triethoxysilyl)propyl)imidazolidine, 1,3-bis(3-(dimethoxyethylsilyl)propyl)imidazolidine, 1,3-bis(3-(trimethoxysilyl)propyl)hexahydropyrimidine, 1,3-bis(3-(triethoxysilyl)propyl)hexahydropyrimidine and 1,3-bis(3-(tributoxysilyl)propyl)-1,2,3,4-tetrahydropyrimidine.

The term "monovalent hydrocarbon group" used in the present invention may mean a monovalent atomic group in which carbon and hydrogen are bonded, for example, monovalent alkyl, alkenyl, alkynyl, cycloalkyl, cycloalkyl including one or more unsaturated bond, and aryl, and the minimum number of carbon atoms of a substituent represented by monovalent hydrocarbon may be determined by the kind of each substituent.

The term "divalent hydrocarbon group" used in the present invention may mean a divalent atomic group in which carbon and hydrogen are bonded, for example, divalent alkylene, alkenylene, alkynylene, cycloalkylene, cycloalkylene including one or more unsaturated bond, and arylene, and the minimum number of carbon atoms of a substituent represented by divalent hydrocarbon may be determined by the kind of each substituent.

The term "alkyl group" used in the present invention may mean monovalent aliphatic saturated hydrocarbon, and may mean including all linear alkyl groups such as methyl, ethyl, propyl and butyl, and branched alkyl groups such as isopropyl, sec-butyl, tert-butyl and neo-pentyl.

The term "alkylene group" used in the present invention may mean divalent aliphatic saturated hydrocarbon such as methylene, ethylene, propylene and butylene.

The term "alkenyl group" used in the present invention may mean an alkyl group including one or two or more double bonds.

The term "alkynyl group" used in the present invention may mean an alkyl group including one or two or more triple bonds.

The term "cycloalkyl group" used in the present invention may mean cyclic saturated hydrocarbon, or cyclic unsaturated hydrocarbon including one or two or more unsaturated bonds.

The term "aryl group" used in the present invention may mean cyclic aromatic hydrocarbon, and may mean including monocyclic aromatic hydrocarbon in which one cycle is formed, or polycyclic aromatic hydrocarbon in which two or more cycles are combined.

The term "heterocyclic group" used in the present invention may mean including a cycloalkyl group or an aryl group, in which a carbon atom in the cycloalkyl group or the aryl group is substituted with one or more heteroatoms.

According to an embodiment of the present invention, the reaction or coupling of step (S2) may be performed in a modification reactor, and in this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:2 based on 1 mol of the organometal compound of step (S1).

In addition, according to an embodiment of the present invention, the modifier may be injected into a modification reactor, and step (S2) may be performed in the modification reactor. In another embodiment, the modifier may be injected to a transporting part for transporting an active polymer prepared in step (S1) to a modification reactor for performing step (S2), and in the transporting part, reaction or coupling by the mixing of the active polymer and the modifier may be performed.

According to the present invention, a modified conjugated diene-based polymer prepared according to the preparation method of a modified conjugated diene-based polymer is provided. The modified conjugated diene-based polymer may include a conjugated diene-based monomer derived repeating unit and a modifier derived functional group. The conjugated diene-based monomer derived repeating unit may mean a repeating unit formed during polymerizing a conjugated diene-based monomer, and the modifier derived functional group may mean a functional group derived from a modifier present at one terminal of an active polymer via reaction or coupling between an active polymer and a modifier.

Meanwhile, the modified conjugated diene-based polymer may be, for example, a copolymer further including an aromatic vinyl monomer derived repeating unit together with the conjugated diene-based monomer derived repeating unit. If the modified conjugated diene-based polymer is a copolymer including an aromatic vinyl monomer derived repeating unit, the modified conjugated diene-based polymer may include greater than 0 wt % to 90 wt % of the aromatic vinyl monomer derived repeating unit and in this range, effect of excellent rolling resistance and wet skit resistance may be achieved. In a particular embodiment, the modified conjugated diene-based polymer may include greater than 0 wt % to 90 wt %, greater than 0 wt % to 50 wt %, or greater than 0 wt % to 45 wt %, in a more particular embodiment, greater than 0 wt % to less than 10 wt %, 10 wt % to less than 20 wt %, 20 wt % to less than 30 wt %, or 30 wt % to less than 45 wt % of an aromatic vinyl monomer derived repeating unit, and in each range, effect of excellent rolling resistance and wet skid resistance may be achieved.

According to an embodiment of the present invention, the copolymer may be a random copolymer, and in this case, effect of excellent balance between each of physical properties may be achieved. The random copolymer may mean the repeating units constituting a copolymer arranged in disorder.

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, and a weight average molecular weight (Mw) of 1,000 g/mol to 3,000,000 g/mol, 10,000 g/mol to 2,000,000 g/mol, or 100,000 g/mol to 2,000,000 g/mol. Within these ranges, effect of excellent rolling resistance and wet skid resistance may be achieved. In another embodiment, the modified conjugated diene-based polymer may have molecular weight distribution (PDI; MWD; Mw/Mn) of less than 1.7, 1.0 to less than 1.7, or 1.1 to less than 1.7, and within this range, elasticity properties and viscoelasticity properties are excellent, and balance between each of the physical properties thereof is excellent. In another embodiment, the modified conjugated diene-based polymer may have a unimodal shape molecular weight distribution curve by gel permeation chromatography (GPC). That is, the modified conjugated diene-based polymer according to an embodiment of the present invention may be prepared by a continuous type polymerization, and has a unimodal shape molecular weight distribution curve and molecular weight distribution of less than 1.7.

In another embodiment, the modified conjugated diene-based polymer may have a Si content of 50 ppm or more, 100 ppm or more, 100 ppm to 10,000 ppm, or 100 ppm to 5,000 ppm based on the weight. Within this range, effect of excellent mechanical properties such as tensile properties and viscoelasticity properties may be achieved for a rubber composition including the modified conjugated diene-based polymer. The Si content may mean the amount of Si atoms present in the modified conjugated diene-based polymer. Meanwhile, the Si atom may be derived from a modifier derived functional group.

The Si content may be measured via, for example, an ICP analysis method, and the ICP analysis method may be measured using an inductively coupled plasma optical emission spectroscopy (ICP-OES; Optima 7300DV). If the inductively coupled plasma optical emission spectroscopy is used, measurement may be performed by adding about 0.7 g of a specimen to a platinum (Pt) crucible, adding about 1 ml of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr) and 3) step 3: initial temp 370° C., rate (temp/hr) 47° C./hr, temp (holdtime) 510° C. (3 hr), adding 1 ml of concentrated nitric acid (48 wt %) and 20 µl of concentrated hydrofluoric acid (50 wt %) to a residue, sealing the platinum crucible and shaking for 30 minutes or more, adding 1 ml of boric acid to the specimen, storing at 0° C. for 2 hours or more, diluting in 30 ml ultrapure water, and performing incineration.

The modified conjugated diene-based polymer may have mooney viscosity at 100° C. of 30 or more, 40 to 150, or 40 to 140, and within this range, effect of excellent processability and productivity may be achieved.

In addition, the modified conjugated diene-based polymer may have a vinyl content of 5 wt % or more, 10 wt % or more, or 10 wt % to 60 wt %. Here, the vinyl content may mean the amount of not 1.4-added but 1.2-added conjugated diene-based monomer based on 100 wt % of a conjugated diene-based copolymer constituted of a monomer having a vinyl group and an aromatic vinyl-based monomer.

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effect of excellent balance between each of physical properties may be achieved.

In addition, the rubber composition may further include other rubber component, if needed, in addition to the modified conjugated diene-based polymer, and in this case, the rubber component may be included in an amount of 90 wt % or less based on the total amount of the rubber composition. In a particular embodiment, the rubber component may be included in an amount of 1 part by weight to 900 parts by weight based on 100 parts by weight of the modified conjugated diene-based copolymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture two or more thereof may be used.

The rubber composition may include a filler of 0.1 parts by weight to 200 parts by weight, or 10 parts by weight to 120 parts by weight based on 100 parts by weight of the modified conjugated diene-based polymer. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon black-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl) polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having a high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. With the amount used in the above range, effect as a coupling agent may be sufficiently exhibited, and preventing effect of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. With the amount used in the above range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may be used or not, according to the need, and the kind thereof includes, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluene, 2,6-bis((dodecylthio) methyl)-4-nonylphenol or 2-methyl-4,6-bis((octylthio) methyl)phenol, and may be used in an amount of 0.1 parts by weight to 6 parts by weight based on 100 parts by weight of a rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a dustproof rubber, a belt conveyor, and a hose.

Also, the present invention provides a tire manufactured using the rubber composition.

The tire may be a tire or include a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a first reactor among continuous reactors in which three reactors were connected in series, injected were a styrene solution in which 60 wt % of styrene was dissolved in n-hexane in a rate of 3.6 kg/h, a 1,3-butadiene solution in which 60 wt % of 1,3-butadiene was dissolved in n-hexane in a rate of 12.6 kg/h, n-hexane in a rate of 47.2 kg/h, a 1,2-butadiene solution in which 2.0 wt % of 1,2-butadiene was dissolved in n-hexane in a rate of 40 g/h, a 2,2-di(2-tetrahydrofuryl)propane (DTP) solution in which 10 wt % of 2,2-di(2-tetrahydrofuryl)propane was dissolved in n-hexane as a polar additive in a rate of 125.0 g/h, and an n-butyllithium solution in which 10 wt % of n-butyllithium was dissolved in n-hexane as a polymerization initiator in a rate of 46.0 g/h.

In this case, the temperature of the first reactor was maintained to 45° C., and when a polymerization conversion ratio reached 48%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.65 kg/h. In this case, the temperature of the second reactor was maintained to 60° C., and when a polymerization conversion ratio reached 95%, a polymer was transported from the second reactor to a third reactor via a transport pipe.

The polymer was transported from the second reactor to the third reactor to inject 3,3'-(1,1,3,3-tetramethoxydisiloxane-1,3-diyl)bis(N,N-diethylpropan-1-amine) to the third reactor as a modifier [modifier:act. Li=1:1 mol]. In this case, the modifier was injected in a solution state by dissolving in n-hexane. The temperature of the third reactor was maintained to 60° C.

After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 2

To a first reactor among continuous reactors in which three reactors were connected in series, injected were a styrene solution in which 60 wt % of styrene was dissolved in n-hexane in a rate of 3.6 kg/h, a 1,3-butadiene solution in which 60 wt % of 1,3-butadiene was dissolved in n-hexane in a rate of 12.6 kg/h, n-hexane in a rate of 47.2 kg/h, a 1,2-butadiene solution in which 2.0 wt % of 1,2-butadiene was dissolved in n-hexane in a rate of 40 g/h, a 2,2-di(2-tetrahydrofuryl)propane solution in which 10 wt % of 2,2-di(2-tetrahydrofuryl)propane was dissolved in n-hexane as a polar additive in a rate of 125.0 g/h, and an n-butyllithium solution in which 10 wt % of n-butyllithium was dissolved in n-hexane as a polymerization initiator in a rate of 36.0 g/h.

In this case, the temperature of the first reactor was maintained to 55° C., and when a polymerization conversion ratio reached 45%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.65 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor to inject 3,3'-(1,1,3,3-tetramethoxydisiloxane-1,3-diyl)bis(N,N-diethylpropan-1-amine) to the third reactor as a modifier [modifier:act. Li=1:1 mol]. In this case, the modifier was injected in a solution state by dissolving in n-hexane. The temperature of the third reactor was maintained to 65° C.

After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 3

A modified conjugated diene-based polymer was prepared by performing the same method as Example 2 except for continuously supplying to the third reactor N-(3,6,9,12-tetraoxahexadecyl)-N-(3-(triethoxysilyl)propyl)-3,6,9,12-tetraoxahexadecan-1-amine instead of 3,3'-(1,1,3,3-tetramethoxydisiloxane-1,3-diyl)bis(N,N-diethylpropane-1-amine) as a modifier [modifier:act. Li=1:1 mol].

Example 4

To a first reactor among continuous reactors in which three reactors were connected in series, injected were a styrene solution in which 60 wt % of styrene was dissolved in n-hexane in a rate of 3.3 kg/h, a 1,3-butadiene solution in which 60 wt % of 1,3-butadiene was dissolved in n-hexane in a rate of 10.9 kg/h, n-hexane in a rate of 39.4 kg/h, a 1,2-butadiene solution in which 2.0 wt % of 1,2-butadiene was dissolved in n-hexane in a rate of 40 g/h, a solution in which 10 wt % of N,N,N',N'-tetramethylethylenediamine (TMEDA) was dissolved in n-hexane as a polar additive in a rate of 7.0 g/h, and an n-butyllithium solution in which 10 wt % of n-butyllithium was dissolved in n-hexane as a polymerization initiator in a rate of 46.0 g/h.

In this case, the temperature of the first reactor was maintained to 60° C., and when a polymerization conversion ratio reached 48%, a polymer was transported from the first reactor to a second reactor via a transport pipe. Then, to the second reactor, a 1,3-butadiene solution in which 60 wt % of 1,3-butadiene was dissolved in n-hexane was injected in a rate of 2.4 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor to inject N-(3,6,9,12-tetraoxahexadecyl)-N-(3-(triethoxysilyl)propyl)-3,6,9,12-tetraoxahexadecane-1-amine to the third reactor as a modifier [modifier:act. Li=1:1 mol]. In this case, the modifier was injected in a solution state by dissolving in n-hexane. The temperature of the third reactor was maintained to 65° C.

After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 5

To a first reactor among continuous reactors in which three reactors were connected in series, injected were a styrene solution in which 60 wt % of styrene was dissolved in n-hexane in a rate of 1.8 kg/h, a 1,3-butadiene solution in which 60 wt % of 1,3-butadiene was dissolved in n-hexane in a rate of 14.2 kg/h, n-hexane in a rate of 49.1 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propane was dissolved in n-hexane as a polar additive in a rate of 51.0 g/h, and an n-butyllithium solution in which 10 wt % of n-butyllithium was dissolved in n-hexane as a polymerization initiator in a rate of 59.0 g/h. In this case, the temperature of the first reactor was maintained to 55° C., and when a polymerization conversion ratio reached 31%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.74 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor to inject 1,4-bis(3-(triethoxysilyl)propyl) piperazine as a modifier to the third reactor [modifier:act. Li=1:1 mol]. In this case, the modifier was injected in a solution state by dissolving in n-hexane. The temperature of the third reactor was maintained to 65° C. After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 6

A modified conjugated diene-based polymer was prepared by performing the same method as Example 5 except for continuously supplying to the third reactor 3,3'-(1,1,3,3-tetramethoxydisiloxane-1,3-diyl)bis(N,N-diethylpropane-1-amine) instead of 1,4-bis(3-(triethoxysilyl)propyl)piperazine as a modifier [modifier:act. Li=1:1 mol].

Example 7

To a first reactor among continuous reactors in which three reactors were connected in series, injected were a styrene solution in which 60 wt % of styrene was dissolved in n-hexane in a rate of 1.8 kg/h, a 1,3-butadiene solution in which 60 wt % of 1,3-butadiene was dissolved in n-hexane in a rate of 14.2 kg/h, n-hexane in a rate of 49.1 kg/h, a 1,2-butadiene solution in which 2.0 wt % of 1,2-butadiene was dissolved in n-hexane in a rate of 40 g/h, a solution in which 10 wt % of N,N,N',N'-tetramethylethylenediamine was dissolved in n-hexane as a polar additive in a rate of 25.0 g/h, and an n-butyllithium solution in which 10 wt % of n-butyllithium was dissolved in n-hexane as a polymerization initiator in a rate of 59 g/h. In this case, the temperature of the first reactor was maintained to 60° C., and when a polymerization conversion ratio reached 46%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.74 kg/h. In this case, the temperature of the second reactor was maintained to 70° C., and when a polymerization conversion ratio reached 95%, a polymer was transported from the second reactor to a third reactor via a transport pipe.

The polymer was transported from the second reactor to the third reactor to inject N-(3,6,9,12-tetraoxahexadecyl)-N-(3-(triethoxysilyl)propyl)-3,6,9,12-tetraoxahexadecane-1-amine as a modifier to the third reactor [modifier:act. Li=1:1 mol]. In this case, the modifier was injected in a solution state by dissolving in n-hexane. The temperature of the third reactor was maintained to 70° C.

After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 8

To a first reactor among continuous reactors in which three reactors were connected in series, injected were a styrene solution in which 60 wt % of styrene was dissolved in n-hexane in a rate of 6.1 kg/h, a 1,3-butadiene solution in which 60 wt % of 1,3-butadiene was dissolved in n-hexane in a rate of 10.1 kg/h, n-hexane in a rate of 47.5 kg/h, a 1,2-butadiene solution in which 2.0 wt % of 1,2-butadiene was dissolved in n-hexane in a rate of 40 g/h, a 2,2-di(2-tetrahydrofuryl)propane solution in which 10 wt % of 2,2-di(2-tetrahydrofuryl)propane was dissolved in n-hexane as a polar additive in a rate of 50.0 g/h, and an n-butyllithium solution in which 10 wt % of n-butyllithium was dissolved in n-hexane as a polymerization initiator in a rate of 31.0 g/h. In this case, the temperature of the first reactor was maintained to 55° C., and when a polymerization conversion ratio reached 50%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.5 kg/h. In this case, the temperature of the second reactor was maintained to 65° C., and when a polymerization conversion ratio reached 95%, a polymer was transported from the second reactor to a third reactor via a transport pipe.

The polymer was transported from the second reactor to the third reactor to inject 3,3'-(1,1,3,3-tetramethoxydisiloxane-1,3-diyl)bis(N,N-diethylpropan-1-amine) to the third reactor as a modifier [modifier:act. Li=1:1 mol]. In this case, the modifier was injected in a solution state by dissolving in n-hexane. The temperature of the third reactor was maintained to 65° C.

After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 9

To a first reactor among continuous reactors in which three reactors were connected in series, injected were a 1,3-butadiene solution in which 60 wt % of 1,3-butadiene was dissolved in n-hexane in a rate of 15.0 kg/h, n-hexane in a rate of 48.3 kg/h, a 1,2-butadiene solution in which 2.0 wt % of 1,2-butadiene was dissolved in n-hexane in a rate of 36.0 g/h, a solution in which 1 wt % of N,N,N',N'-tetramethylethylenediamine was dissolved in n-hexane as a polar additive in a rate of 31.5 g/h, and an n-butyllithium solution in which 10 wt % of n-butyllithium was dissolved in n-hexane as a polymerization initiator in a rate of 58.5 g/h. In this case, the temperature of the first reactor was maintained to 55° C., and when a polymerization conversion ratio reached 43%, a polymer was transported from the first reactor to a second reactor via a transport pipe.

The temperature of the second reactor was maintained to 65° C., and when a polymerization conversion ratio reached 95%, a polymer was transported from the second reactor to the third reactor via a transport pipe.

The polymer was transported from the second reactor to the third reactor to inject 1,4-bis(3-(triethoxysilyl)propyl)piperazine to the third reactor as a modifier [modifier:act. Li=1:1 mol]. In this case, the modifier was injected in a solution state by dissolving in n-hexane. The temperature of the third reactor was maintained to 65° C.

After that, to a polymerization solution discharged from the third reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 10

To a first reactor among continuous reactors in which two reactors were connected in series, injected were a styrene solution in which 60 wt % of styrene was dissolved in n-hexane in a rate of 3.6 kg/h, a 1,3-butadiene solution in which 60 wt % of 1,3-butadiene was dissolved in n-hexane in a rate of 12.6 kg/h, n-hexane in a rate of 47.2 kg/h, a 1,2-butadiene solution in which 2.0 wt % of 1,2-butadiene was dissolved in n-hexane in a rate of 40 g/h, a 2,2-di(2-tetrahydrofuryl)propane solution in which 10 wt % of 2,2-di(2-tetrahydrofuryl)propane was dissolved in n-hexane as a polar additive in a rate of 125.0 g/h, and an n-butyllithium solution in which 10 wt % of n-butyllithium was dissolved in n-hexane as a polymerization initiator in a rate of 46.0 g/h.

In this case, the temperature of the first reactor was maintained to 50° C., and when a polymerization conversion ratio reached 50%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 0.65 kg/h. In this case, the temperature of the second reactor was maintained to 65° C., and when a polymerization conversion ratio reached 95%, a polymer was transported from the second reactor to a blend tank via a transport pipe.

During transporting the polymer from the second reactor to the blend tank, N-(3,6,9,12-tetraoxahexadecyl)-N-(3-(triethoxysilyl)propyl)-3,6,9,12-tetraoxahexadecane-1-amine was injected as a modifier to a line for transporting to the blend tank [modifier:act. Li=1:1 mol].

After that, to a polymerization solution discharged from the second reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 11

To a first reactor among continuous reactors in which two reactors were connected in series, injected were a styrene solution in which 60 wt % of styrene was dissolved in n-hexane in a rate of 3.3 kg/h, a 1,3-butadiene solution in which 60 wt % of 1,3-butadiene was dissolved in n-hexane in a rate of 10.9 kg/h, n-hexane in a rate of 39.4 kg/h, a 1,2-butadiene solution in which 2.0 wt % of 1,2-butadiene was dissolved in n-hexane in a rate of 40 g/h, a N,N,N',N'-tetramethylethylenediamine solution in which 10 wt % of N,N,N',N'-tetramethylethylenediamine was dissolved in n-hexane as a polar additive in a rate of 7.0 g/h, and an n-butyllithium solution in which 10 wt % of n-butyllithium was dissolved in n-hexane as a polymerization initiator in a rate of 46.0 g/h. In this case, the temperature of the first reactor was maintained to 65° C., and when a polymerization conversion ratio reached 48%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 2.4 kg/h. In this case, the temperature of the second reactor was maintained to 70° C., and when a polymerization conversion ratio reached 95%, a polymer was transported from the second reactor to a blend tank via a transport pipe.

During transporting the polymer from the second reactor to the blend tank, 3,3'-(1,1,3,3-tetramethoxydisiloxane-1,3-diyl)bis(N,N-diethylpropane-1-amine was injected as a modifier to a line for transporting to the blend tank [modifier:act. Li=1:1 mol]. In this case, the modifier was injected in a solution state after dissolving in n-hexane.

After that, to a polymerization solution discharged from the second reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Example 12

To a first reactor among continuous reactors in which two reactors were connected in series, injected were a styrene solution in which 60 wt % of styrene was dissolved in n-hexane in a rate of 3.3 kg/h, a 1,3-butadiene solution in which 60 wt % of 1,3-butadiene was dissolved in n-hexane in a rate of 10.9 kg/h, n-hexane in a rate of 39.4 kg/h, a 1,2-butadiene solution in which 2.0 wt % of 1,2-butadiene was dissolved in n-hexane in a rate of 40 g/h, a 2,2-di(2-tetrahydrofuryl)propane solution in which 10 wt % of 2,2-di(2-tetrahydrofuryl)propane was dissolved in n-hexane as a polar additive in a rate of 2.0 g/h, and an n-butyllithium solution in which 10 wt % of n-butyllithium was dissolved in n-hexane as a polymerization initiator in a rate of 46.0 g/h. In this case, the temperature of the first reactor was maintained to 55° C., and when a polymerization conversion ratio reached 50%, a polymer was transported from the first reactor to a second reactor via a transport pipe.

Then, to the second reactor, a 1,3-butadiene solution in which 60 wt % of 1,3-butadiene was dissolved in n-hexane was injected in a rate of 2.4 kg/h. In this case, the temperature of the second reactor was maintained to 70° C., and when a polymerization conversion ratio reached 95%, a polymer was transported from the second reactor to a blend tank via a transport pipe.

During transporting the polymer from the second reactor to the blend tank, 3,3'-(1,1,3,3-tetramethoxydisiloxane-1,3-diyl)bis(N,N-diethylpropane-1-amine was injected as a modifier to a line for transporting to the blend tank [modifier:act. Li=1:1 mol]. In this case, the modifier was injected in a solution state after dissolving in n-hexane.

After that, to a polymerization solution discharged from the second reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

Comparative Example 1

To a 20 L autoclave reactor, 100 g of styrene, 880 g of 1,3-butadiene, 5,000 g of n-hexane and 0.89 g of 2,2-di(2-tetrahydrofuryl)propane as a polar additive were injected, and the internal temperature of the reactor was elevated to 40° C. After the internal temperature of the reactor reached 40° C., 4.7 mmol of n-butyllithium as a polymerization initiator was injected and an adiabatic heating reaction was performed. After about 20 minutes lapse, 20 g of 1,3-butadiene was injected for capping the terminals of a polymer with butadiene. After 5 minutes, 4.7 mmol of 3,3'-(1,1,3,3,-tetramethoxydisiloxane-1,3-diyl)bis(N,N-diethylpropane-1-amine) was injected and reacted for 15 minutes. Then, the polymerization reaction was quenched by using ethanol, and 45 ml of a solution in which 0.3 wt % of IR1520 (BASF Co.) antioxidant was dissolved in n-hexane was added thereto. Then, the polymer thus obtained was injected into hot water heated using steam and stirred to remove solvents to prepare a modified styrene-butadiene copolymer.

Comparative Example 2

A modified conjugated diene-based polymer was prepared by performing the same method as in Example 2 except for not adding a modifier.

Comparative Example 3

A modified conjugated diene-based polymer was prepared by performing the same method as in Example 1 except for maintaining the reaction temperature to 55° C. at the first reactor, 65° C. at the second reactor, and 65° C. at the third reactor, and injecting dimethyl dichlorosilane instead of 3,3'-(1,1,3,3-tetramethoxydisiloxane-1,3-diyl)bis(N,N-diethylpropane-1-amine) as a modifier [modifier:cat. Li=1:1 mol]. In this case, the modifier was injected in a solution state by dissolving in n-hexane.

Comparative Example 4

A modified conjugated diene-based polymer was prepared by performing the same method as in Example 1 except for maintaining the reaction temperature to 75° C. at the first reactor, 85° C. at the second reactor, and 85° C. at the third reactor, and transporting a polymer from the first reactor to the second reactor via a transport pipe when a polymerization conversion ratio in the first reactor became 68%.

Comparative Example 5

A modified conjugated diene-based polymer was prepared by performing the same method as in Comparative Example 4 except for transporting a polymer from the first reactor to the second reactor via a transport pipe when a polymerization conversion ratio in the first reactor reached 73%, and injecting N-(3,6,9,12-tetraoxahexadecyl)-N-(3-(triethoxysilyl)propyl)-3,6,9,12-tetraoxahexadecane-1-amine instead of 3,3'-(1,1,3,3-tetramethoxydisiloxane-1,3-diyl)bis(N,N-diethylpropane-1-amine as a modifier and polymerizing [modifier:cat. Li=1:1 mol]. In this case, the modifier was injected in a solution state by dissolving in n-hexane.

Comparative Example 6

A modified conjugated diene-based polymer was prepared by performing the same method as in Example 6 except for maintaining the reaction temperature to 75° C. at the first reactor, 85° C. at the second reactor, and 85° C. at the third reactor, and transporting a polymer from the first reactor to the second reactor via a transport pipe when a polymerization conversion ratio in the first reactor reached 65% and polymerizing.

Comparative Example 7

A modified conjugated diene-based polymer was prepared by performing the same method as in Example 6 except for maintaining the reaction temperature to 75° C. at the first reactor, 80° C. at the second reactor, and 80° C. at the third reactor, transporting a polymer from the first reactor to the second reactor via a transport pipe when a polymerization conversion ratio in the first reactor reached 70%, and injecting tetrachlorosilane as a modifier in the third reactor [modifier:cat. Li=1:1 mol]. In this case, the modifier was injected in a solution state by dissolving in n-hexane.

Comparative Example 8

A modified conjugated diene-based polymer was prepared by performing the same method as in Example 8 except for maintaining the reaction temperature to 75° C. at the first reactor, 85° C. at the second reactor, and 85° C. at the third reactor, transporting a polymer from the first reactor to the second reactor via a transport pipe when a polymerization conversion ratio in the first reactor reached 63% and polymerizing.

Comparative Example 9

A modified conjugated diene-based polymer was prepared by performing the same method as in Example 8 except for performing polymerization by injecting dimethyldichlorosilane instead of 3,3'-(1,1,3,3-tetramethoxydisiloxane-1,3-diyl)bis(N,N-diethylpropane-1-amine as a modifier [modifier:cat. Li=1:1 mol]. In this case, the modifier was injected in a solution state by dissolving in n-hexane.

Comparative Example 10

A modified conjugated diene-based polymer was prepared by performing the same method as in Example 9 except for maintaining the reaction temperature to 75° C. at the first reactor, 85° C. at the second reactor, and 85° C. at the third reactor, and transporting a polymer from the first reactor to the second reactor via a transport pipe when a polymerization conversion ratio in the first reactor reached 70% and polymerizing.

Comparative Example 11

A modified conjugated diene-based polymer was prepared by performing the same method as in Example 9 except for transporting a polymer from the first reactor to the second reactor via a transport pipe when a polymerization conversion ratio in the first reactor reached 46%, and injecting tetrachlorosilane instead of 1,4-bis(3-(triethoxysilyl)propyl) piperazine as a modifier and polymerizing [modifier:cat. Li=1:1 mol]. In this case, the modifier was injected in a solution state by dissolving in n-hexane.

Comparative Example 12

A modified conjugated diene-based polymer was prepared by performing the same method as in Example 4 except for maintaining the reaction temperature to 75° C. at the first reactor, 85° C. at the second reactor, and 85° C. at the third reactor, transporting a polymer from the first reactor to the second reactor via a transport pipe when a polymerization conversion ratio in the first reactor reached 67%, and injecting dimethyldichlorosilane instead of N-(3,6,9,12-tetraoxa-hexadecyl)-N-(3-(triethoxysilyl)propyl)-3,6,9,12-tetraoxa-hexadecane-1-amine as a modifier and polymerizing [modifier:cat. Li=1:1 mol]. In this case, the modifier was injected in a solution state by dissolving in n-hexane.

Comparative Example 13

To a first reactor among continuous reactors in which two reactors were connected in series, injected were a styrene solution in which 60 wt % of styrene was dissolved in n-hexane in a rate of 1.8 kg/h, a 1,3-butadiene solution in which 60 wt % of 1,3-butadiene was dissolved in n-hexane in a rate of 14.2 kg/h, n-hexane in a rate of 49.1 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propane was dissolved in n-hexane as a polar additive in a rate of 51.0 g/h, and an n-butyllithium solution in which 10 wt % of n-butyllithium was dissolved in n-hexane as a polymerization initiator in a rate of 59 g/h. In this case, the temperature of the first reactor was maintained to 75° C., and when a polymerization conversion ratio reached 95%, a polymer was transported from the first reactor to the second reactor via a transport pipe. Into the pipe for transporting from the first reactor to the second reactor, a 1,3-butadiene solution in which 60 wt % of 1,3-butadiene was dissolved in n-hexane was injected in a rate of 0.74 kg/h.

To the second reactor, 3,3'-(1,1,3,3-tetramethoxydisiloxane-1,3-diyl)bis(N,N-diethylpropane-1-amine) was injected as a modifier [modifier:act. Li=1:1 mol]. In this case, the modifier was injected in a solution state after dissolving in n-hexane. The temperature of the second reactor was maintained to 80° C., and after that, to a polymerization solution discharged from the second reactor, an IR1520 (BASF Co.) solution in which 30 wt % was dissolved as an antioxidant was injected in a rate of 170 g/h and stirred. The polymer thus obtained was injected in hot water heated with steam and stirred to remove solvents to prepare a modified conjugated diene-based polymer.

EXPERIMENTAL EXAMPLES

Experimental Example 1

With respect to each of modified or unmodified conjugated diene-based polymers prepared in the examples and the comparative examples, styrene unit and vinyl contents in each polymer, a weight average molecular weight (Mw, ×10$^3$ g/mol), a number average molecular weight (Mn, ×10$^3$ g/mol), molecular weight distribution (PDI, MWD), mooney viscosity (MV), and an amount of Si were measured. The results are shown in Table 1 to Table 5 below. In addition, reaction conditions and polar additives and modifiers used in Examples 1 to 12 and Comparative Examples 1 to 13 are summarized and shown in Table 1 to Table 5 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethanol was used as a solvent, and styrene unit and vinyl contents were calculated by calculating a solvent peak as 5.97 ppm, and regarding 7.2-6.9 ppm as a random styrene peak, 6.9-6.2 ppm as a block styrene peak, 5.8-5.1 ppm as a 1,4-vinyl peak, and 5.1-4.5 ppm as a 1,2-vinyl peak.

2) Weight Average Molecular Weight (Mw, ×10$^3$ g/Mol), Number Average Molecular Weight (Mn, ×10$^3$ g/Mol) and Molecular Weight Distribution (PDI, MWD)

Figure 2:
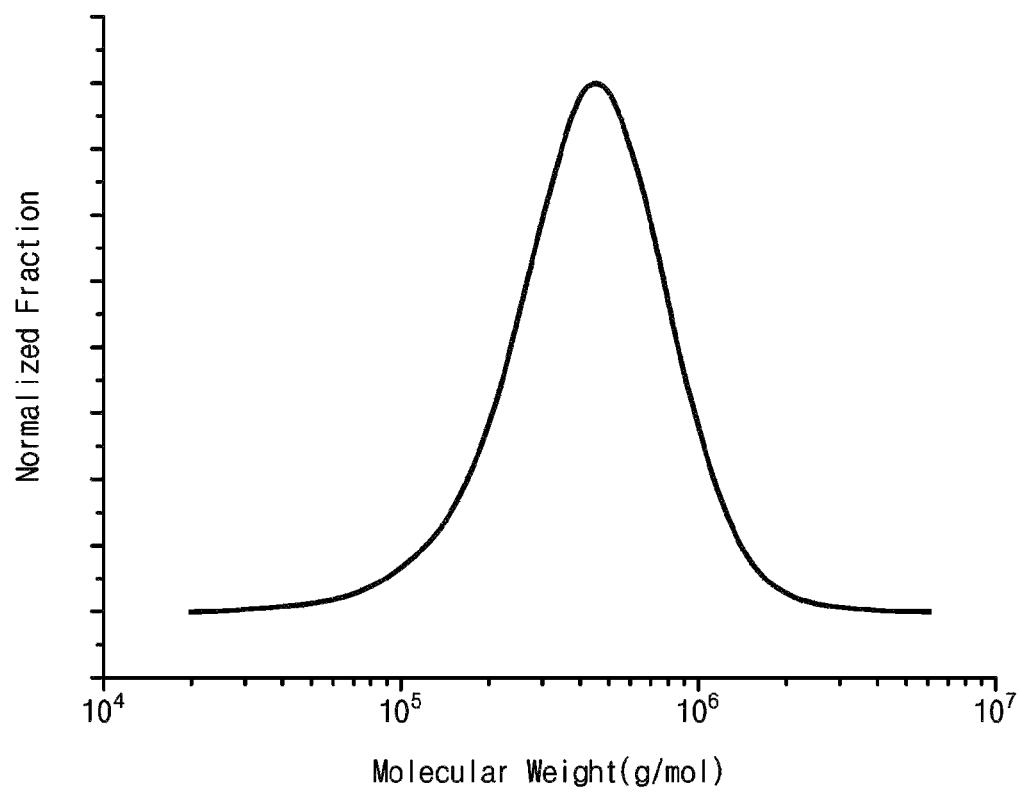
FIG. 2 illustrates a molecular weight distribution curve by gel permeation chromatography (GPC) of a modified conjugated diene-based polymer of Example 6 according to an embodiment of the present invention.

By gel permeation chromatography (GPC) analysis, the weight average molecular weight (Mw) and the number average molecular weight (Mn) were measured and a molecular weight distribution curve was obtained. In addition, the molecular weight distribution (PDI, MWD, Mw/Mn) was calculated from each molecular weight thus measured. Particularly, GPC was conducted using two columns of PLgel Olexis (Polymer Laboratories Co. Ltd.) and one column of PLgel mixed-C (Polymer Laboratories Co. Ltd.) in combination, and polystyrene (PS) as a GPC standard material for calculating the molecular weights. A solvent for measuring GPC was prepared by mixing tetrahydrofuran with 2 wt % of an amine compound. In this case, the molecular weight distribution curves thus obtained are shown in FIG. 1 and FIG. 2.

3) Mooney Viscosity

The mooney viscosity (MV, (ML1+4, @100° C.) MU) was measured by using MV-2000 (Alpha Technologies Co., Ltd.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

4) Si Content

The Si content was measured by an ICP analysis method, which used an inductively coupled plasma optical emission spectroscopy (ICP-OES; Optima 7300DV). If the inductively coupled plasma optical emission spectroscopy was used, measurement was performed by adding about 0.7 g of a specimen to a platinum (Pt) crucible and adding about 1 ml of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)

3) step 3: initial temp 370° C., rate (temp/hr) 47° C./hr, temp (holdtime) 510° C. (3 hr), adding 1 ml of concentrated nitric acid (48 wt %) and 20 µl of concentrated hydrofluoric acid (50 wt %) to a residue, sealing the platinum crucible and shaking for 30 minutes or more, adding 1 ml of boric acid to the specimen, storing at 0° C. for 2 hours or more, diluting in 30 ml of ultrapure water, and performing incineration.

TABLE 1

|  | Division | Example | | | | Comparative Example | | | |
| --- | --- | --- | --- | --- | --- | --- | --- | --- | --- |
|  |  | 1 | 2 | 3 | 10 | 2 | 3 | 4 | 5 |
| Reaction conditions | Number of reactor | 3 | 3 | 3 | 2 | 3 | 3 | 3 | 3 |
|  | Polar additive | DTP | DTP | DTP | DTP | DTP | DTP | DTP | DTP |
|  | Modifier | A | A | B | B | — | D | A | B |
|  | M:PI |  |  |  | 1:1 |  |  |  |  |
|  | First reactor temp (° C.) | 45 | 55 | 55 | 50 | 55 | 55 | 75 | 75 |
|  | First reactor polymerization conversion ratio (%) | 48 | 45 | 45 | 50 | 45 | 48 | 68 | 73 |
| NMR (wt %) | SM | 21 | 21 | 21 | 21 | 21 | 21 | 21 | 21 |
|  | Vinyl | 50 | 50 | 50 | 50 | 50 | 50 | 50 | 50 |
| GPC | Mw (×10$^3$ g/mol) | 530 | 860 | 848 | 482 | 814 | 589 | 723 | 768 |
|  | Mn (×10$^3$ g/mol) | 337 | 551 | 547 | 307 | 550 | 310 | 330 | 328 |
|  | PDI | 1.57 | 1.56 | 1.55 | 1.57 | 1.48 | 1.90 | 2.19 | 2.34 |
| Mooney viscosity (MV) |  | 68 | 81 | 79 | 69 | 79 | 68 | 70 | 78 |
| Si content (ppm) |  | 200 | 100 | 68 | 180 | — | 30 | 150 | 80 |

TABLE 2

|  | Division | Example | | | Comparative Example |
| --- | --- | --- | --- | --- | --- |
|  |  | 4 | 11 | 12 | 12 |
| Reaction conditions | Number of reactor | 3 | 2 | 2 | 3 |
|  | Polar additive | TMEDA | TMEDA | DTP | TMEDA |
|  | Modifier | B | A | A | D |
|  | M:PI |  |  | 1:1 |  |
|  | First reactor temp (° C.) | 60 | 65 | 55 | 75 |
|  | First reactor polymerization conversion ratio (%) | 48 | 48 | 50 | 67 |
| NMR (wt %) | SM | 18 | 18 | 18 | 18 |
|  | Vinyl | 10 | 10 | 10 | 10 |
| GPC | Mw (×10$^3$ g/mol) | 624 | 643 | 596 | 732 |
|  | Mn (×10$^3$ g/mol) | 400 | 420 | 403 | 400 |
|  | PDI | 1.56 | 1.53 | 1.48 | 1.83 |
| Mooney viscosity (MV) |  | 73 | 75 | 75 | 72 |
| Si content (ppm) |  | 93 | 187 | 180 | 69 |

TABLE 3

| | Division | Example | | | Comparative Example | | | |
|---|---|---|---|---|---|---|---|---|
| | | 5 | 6 | 7 | 1 | 6 | 7 | 13 |
| Reaction conditions | Number of reactor | 3 | 3 | 3 | batch | 3 | 3 | 2 |
| | Polar additive | DTP | DTP | TMEDA | DTP | DTP | DTP | DTP |
| | Modifier | C | A | B | A | A | E | A |
| | M:PI | | | 1:1 | | | 0.1:1 | 1:1 |
| | First reactor temp (° C.) | 55 | 55 | 60 | 50→75 | 75 | 75 | 75 |
| | First reactor polymerization conversion ratio (%) | 30 | 31 | 46 | — | 65 | 70 | 100 |
| NMR (wt %) | SM | 10 | 10 | 10 | 10 | 10 | 10 | 10 |
| | Vinyl | 38 | 38 | 38 | 38 | 38 | 38 | 38 |
| GPC | Mw (×10$^3$ g/mol) | 450 | 444 | 450 | 453 | 596 | 615 | 630 |
| | Mn (×10$^3$ g/mol) | 301 | 300 | 300 | 310 | 301 | 303 | 300 |
| | PDI | 1.50 | 1.48 | 1.50 | 1.46 | 1.98 | 2.03 | 2.10 |
| Mooney viscosity (MV) | | 59 | 60 | 59 | 58 | 68 | 67 | 64 |
| Si content (ppm) | | 210 | 260 | 125 | 183 | 170 | 11 | 90 |

TABLE 4

| | Division | Example | Comparative Example | |
|---|---|---|---|---|
| | | 8 | 8 | 9 |
| Reaction conditions | Number of reactor | 3 | 3 | 3 |
| | Polar additive | DTP | DTP | DTP |
| | Modifier | A | A | D |
| | M:PI | | 1:1 | |
| | First reactor temp (° C.) | 55 | 75 | 55 |
| | First reactor polymerization conversion ratio (%) | 50 | 63 | 50 |
| NMR (wt %) | SM | 36 | 36 | 36 |
| | Vinyl | 26 | 26 | 26 |
| GPC | Mw (×10$^3$ g/mol) | 752 | 1006 | 1055 |
| | Mn (×10$^3$ g/mol) | 501 | 503 | 500 |
| | PDI | 1.50 | 2.00 | 2.11 |
| Mooney viscosity (MV) | | 85 | 84 | 86 |
| Si content (ppm) | | 165 | 110 | 25 |

TABLE 5

| | Division | Example | Comparative Example | |
|---|---|---|---|---|
| | | 9 | 10 | 11 |
| Reaction conditions | Number of reactor | 3 | 3 | 3 |
| | Polar additive | TMEDA | TMEDA | TMEDA |
| | Modifier | C | C | E |
| | Ratio of modifier:polymerization initiator (molar ratio) | 1:1 | | 0.1:1 |
| | First reactor temp (° C.) | 55 | 75 | 55 |
| | First reactor polymerization conversion ratio (%) | 43 | 70 | 46 |
| NMR (wt %) | SM | — | — | — |
| | Vinyl | 10 | 10 | 10 |
| GPC | Mw (×10$^3$ g/mol) | 537 | 781 | 893 |
| | Mn (×10$^3$ g/mol) | 351 | 350 | 350 |
| | PDI | 1.52 | 2.23 | 2.55 |
| Mooney viscosity (MV) | | 40 | 45 | 43 |
| Si content (ppm) | | 230 | 121 | 23 |

In Table 1 to Table 5, particular materials and ratios used of the polar additive and the modifier are as follows.

M:PI=molar ratio of modifier (or coupling agent) and polymerization initiator (act. Li)

DTP: 2,2-di(2-tetrahydrofuryl)propane

TMEDA: N,N,N',N'—N,N,N',N'-tetramethylethylenediamine

Modifier A: 3,3'-(1,1,3,3-tetramethoxydisiloxane-1,3-diyl)bis(N,N-diethylpropane-1-amine)

Figure 3:
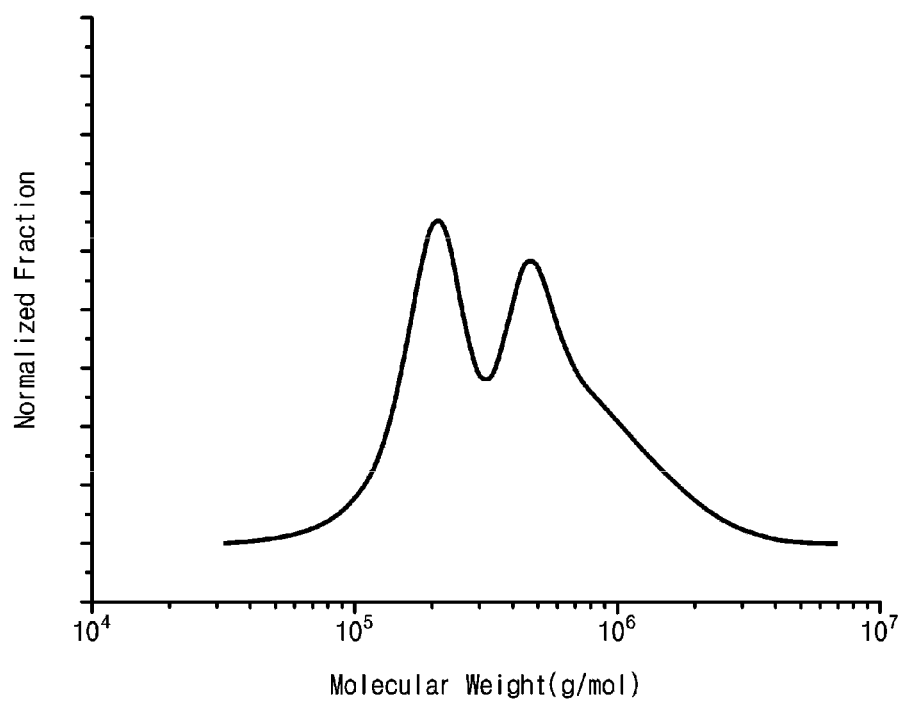
FIG. 3 illustrates a molecular weight distribution curve by gel permeation chromatography (GPC) of a modified conjugated diene-based polymer of Comparative Example 1 according to an embodiment of the present invention.

Modifier B: N-(3,6,9,12-tetraoxahexadecyl)-N-(3-(triethoxysilyl)propyl)-3,6,9,12-tetraoxahexadecane-1-amine Modifier C: 1,4-bis(3-(triethoxysilyl)propyl)piperazine Modifier D: dimethyldichlorosilane Modifier E: tetrachlorosilane As shown in FIG. 1 and FIG. 2, the modified conjugated diene-based polymer of Comparative Example 1, which was prepared by a batch reaction, showed a bimodal shape molecular weight distribution curve by gel permeation chromatography (see FIG. 3), but the modified conjugated diene-based polymers of Example 1 and Example 6, which were prepared by the preparation method according to embodiments of the present invention, showed a unimodal shape entirely different from Comparative Example 1 (see FIG. 1 and FIG. 2).

As shown in Table 1 to Table 5 above, the modified conjugated diene-based polymers of Examples 1 to 12, which were prepared by the preparation method according to embodiments of the present invention, were secured to have narrower PDI (molecular weight distribution) and higher Si content when compared to modified or unmodified conjugated diene-based polymers of Comparative Example 1 to Comparative Example 13.

Particularly, referring to Table 1, the polymers of Comparative Example 4 and Comparative Example 5, which were prepared by the same reaction conditions as those of Example 1 and Example 3, respectively except for deviating the temperature and the polymerization conversion ratio of the first reactor from conditions suggested in the present invention, showed a largely increased PDI (molecular weight distribution) by 1.4 times and remarkably decreased Si content to 75% degree and 87% degree when compared to Example 1 and Example 2, respectively.

In addition, referring to Table 2, the polymer of Comparative Example 12, which was prepared by the same reaction conditions as Example 4 except for deviating the temperature and the polymerization conversion ratio of the first reactor from conditions suggested in the present invention, showed increased degree of PDI by 1.2 times and decreased Si content to 74% degree when compared to Example 4.

In addition, referring to Table 3, the polymer of Comparative Example 6, which was prepared by the same reaction conditions as Example 6 except for deviating the temperature and the polymerization conversion ratio of the first reactor from conditions suggested in the present invention, showed increased degree of PDI by 1.3 times and remarkably decreased Si content when compared to Example 6.

Meanwhile, the modified conjugated diene-based polymer of Comparative Example 1, which was prepared via a batch reaction, showed similar PDI but largely decreased Si content to 70% degree when compared to the modified conjugated diene-based polymer of Example 6, and as secured from Table 9 described later, processability properties were deteriorated.

In addition, referring to Table 4, even the modified conjugated diene-based polymer of Comparative Example 8 was prepared by the same conditions as Example 8 except for the temperature and the polymerization conversion ratio of the first reactor, PDI was increased by 1.4 times and Si content was definitely decreased to 67% degree when compared to Example 8.

Also, referring to Table 5, even the modified conjugated diene-based polymer of Comparative Example 10 was prepared by the same conditions as Example 9 except for the temperature and the polymerization conversion ratio of the first reactor, PDI was markedly increased by 1.5 times and Si content was definitely decreased to 65% degree when compared to Example 9.

The above results show that in the preparation method according to an embodiment of the present invention, polymerization is performed by controlling a polymerization conversion ratio in the first reactor to a specific numeral, and side reactions generated during forming a polymer is restrained and a polymer of a linear structure is induced, and as a result, a modified conjugated diene-based polymer having relatively small molecular weight distribution may be prepared.

In addition, the above results show that a modified conjugated diene-based polymer having a higher modification ratio may be obtained by the preparation method according to an embodiment of the present invention when compared to a preparation method via a batch reaction.

Experimental Example 2

In order to comparatively analyze the physical properties of rubber compositions including each of modified or unmodified copolymers prepared in the examples and the comparative examples and molded articles manufactured therefrom, tensile properties and viscoelasticity properties were measured, and the results are shown in Table 7 to Table 11 below.

1) Preparation of Rubber Specimen

Blending was performed using each of the modified or unmodified conjugated diene-based polymers of the examples and the comparative examples as raw material rubber under the blending conditions shown in Table 6. The raw materials in Table 6 correspond to part by weight based on 100 parts by weight of the raw material rubber.

TABLE 6

| Division | Raw material | Amount (parts by weight) |
| --- | --- | --- |
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent, a process oil, zinc oxide, stearic acid, an antioxidant, an antiaging agent and wax were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator, and a vulcanization accelerator were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when elongated by 300% (300% modulus) of each specimen according to an ASTM 412 tensile test method. Particularly, tensile properties were measured using a Universal Test Machin 4204 tensile tester (Instron Co., Ltd.) in a rate of 50 cm/min at room temperature.

3) Viscoelasticity Properties

The viscoelasticity properties were secured by measuring viscoelasticity behavior on thermodynamic deformation at each measurement temperature (−60° C.~60° C.) with a frequency of 10 Hz by using a dynamic mechanical analyzer (GABO Co., Ltd.) in a film tension mode and securing a tan δ value. From the resultant values, if the index value of tan δ at a low temperature of 0° C. increases, wet skid resistance becomes better, and if the index value of tan δ at a high temperature of 60° C. increases, hysteresis loss decreases, and low running resistance (fuel consumption ratio) becomes better. In this case, each of the resultant values of Example 1 to Example 3, Example 10, Comparative Example 2, Comparative Example 4 and Comparative Example 5 were indexed by setting the resultant value of Comparative Example 3 to 100. Each of the resultant values of Example 4, Example 11, and Example 12 were indexed by setting the resultant value of Comparative Example 12 to 100, and each of the resultant values of Example 5 to Example 7, Comparative Example 1, Comparative Example 6 and Comparative Example 13 were indexed by setting the resultant value of Comparative Example 7 to 100. In addition, each of the resultant values of Example 8 and Comparative Example 8 were indexed by setting the resultant value of Comparative Example 9 to 100, and each of the resultant values of Example 9, and Comparative Example 10 were indexed by setting the resultant value of Comparative Example 11 to 100.

4) Processability Properties

By measuring the mooney viscosity (MV, (ML 1+4, @100° C.) MU) of the secondary mixture compound obtained during preparing the 1) rubber specimen, the processability properties of each polymer was comparatively analyzed, and in this case, the lower the measured value of the moony viscosity is, the better the processability properties are.

Particularly, by using MV-2000 (Alpha Technologies Co., Ltd.) using Large Rotor at a rotor speed of 2±0.02 rpm at 100° C., each secondary mixture compound was stood at room temperature (23±3° C.) for 30 minutes or more, and 27±3 g was collected and put in a die cavity, and then, Platen was operated for 4 minutes for measurement.

TABLE 7

| | Division | Example | | | | Comparative Example | | | |
|---|---|---|---|---|---|---|---|---|---|
| | | 1 | 2 | 3 | 10 | 2 | 3 | 4 | 5 |
| | Processability properties | 62 | 73 | 72 | 63 | 78 | 75 | 71 | 75 |
| Tensile properties | Tensile strength (kgf/cm$^2$) | 175 | 185 | 190 | 180 | 165 | 172 | 175 | 190 |
| | 300% modulus (kgf/cm$^2$) | 160 | 150 | 145 | 155 | 109 | 128 | 150 | 135 |
| Viscoelasticity properties | tan δ (at 0° C., Index) | 102 | 102 | 101 | 103 | 97 | 100 | 101 | 101 |
| | tan δ (at 60° C., Index) | 121 | 118 | 119 | 117 | 70 | 100 | 113 | 109 |

TABLE 8

| | Example | | | Comparative Example |
|---|---|---|---|---|
| Division | 4 | 11 | 12 | 12 |
| Processability properties | 68 | 70 | 71 | 76 |
| Tensile properties Tensile strength (kgf/cm$^2$) | 200 | 210 | 205 | 207 |
| 300% modulus (kgf/cm$^2$) | 80 | 72 | 74 | 60 |
| Viscoelasticity properties tan δ (at 0° C., Index) | 103 | 102 | 103 | 100 |
| tan δ (at 60° C., Index) | 129 | 127 | 125 | 100 |

TABLE 9

| | Division | Example | | | Comparative Example | | | |
|---|---|---|---|---|---|---|---|---|
| | | 5 | 6 | 7 | 1 | 6 | 7 | 13 |
| | Processability properties | 68 | 69 | 68 | 79 | 70 | 65 | 75 |
| Tensile properties | Tensile strength (kgf/cm$^2$) | 150 | 155 | 153 | 153 | 153 | 135 | 151 |
| | 300% modulus (kgf/cm$^2$) | 92 | 95 | 93 | 93 | 85 | 80 | 88 |
| Viscoelasticity properties | tan δ (at 0° C., Index) | 101 | 102 | 102 | 101 | 100 | 100 | 100 |
| | tan δ (at 60° C., Index) | 120 | 125 | 123 | 123 | 111 | 100 | 108 |

TABLE 10

| | | Example | Comparative Example | |
|---|---|---|---|---|
| | Division | 8 | 8 | 9 |
| | Processability properties | 70 | 73 | 72 |
| Tensile properties | Tensile strength (kgf/cm$^2$) | 250 | 251 | 239 |
| | 300% modulus (kgf/cm$^2$) | 150 | 142 | 137 |
| Viscoelasticity properties | tan δ (at 0° C., Index) | 104 | 101 | 100 |
| | tan δ (at 60° C., Index) | 121 | 109 | 100 |

TABLE 11

| | | Example | Comparative Example | |
|---|---|---|---|---|
| | Division | 9 | 10 | 11 |
| | Processability properties | 71 | 73 | 73 |
| Tensile properties | Tensile strength (kgf/cm$^2$) | 200 | 190 | 188 |
| | 300% modulus (kgf/cm$^2$) | 57 | 50 | 35 |
| Viscoelasticity properties | tan δ (at 0° C., Index) | 103 | 101 | 100 |
| | tan δ (at 60° C., Index) | 123 | 111 | 100 |

As shown in Table 7 to Table 11, Example 1 to Example 12 according to exemplary embodiments of the present invention showed improved tensile properties, viscoelasticity properties and processability properties when compared to Comparative Example 1 to Comparative Example 13.

Meanwhile, with respect to the viscoelasticity properties, generally, it is known very difficult that a tan δ value at 0° C. increases while a tan δ value at 60° C. increases at the same time. Accordingly, when compared to Comparative Example 1 to Comparative Example 13, Example 1 to Example 12 showing equal or better degree of a tan δ value at 0° C. and remarkably improved effect of a tan δ value at 60° C., have very excellent viscoelasticity properties.

The invention claimed is:
1. A method for preparing a modified conjugated diene-based polymer comprising:
   polymerizing a conjugated diene-based monomer in the presence of an organometal compound in a hydrocarbon solvent to prepare an active polymer which is coupled with an organometal (S1); and
   a step of reacting or coupling the active polymer prepared in step (S1) with a modifier (S2),
   wherein step (S1) is continuously performed in two or more polymerization reactors, and
   a polymerization conversion ratio in a first polymerization reactor among the polymerization reactors is 50% or less.
2. The method according to claim 1, wherein the polymerization step (S1) is performed at a temperature of 80° C. or less.
3. The method according to claim 1, wherein the conjugated diene-based monomer and an aromatic vinyl monomer are copolymerized in the polymerization step (S1).
4. The method according to claim 1, wherein a final polymerization conversion ratio of the polymerization step (S1) is 95% or more.
5. The method according to claim 1, wherein a residence time of a polymer in the first polymerization reactor is from 1 minute to 40 minutes.
6. The method according to claim 1, wherein a polar additive is included in the polymerization step (S1).
7. The method for preparing a modified conjugated diene-based polymer of claim 1, wherein the modifier has an affinity with silica.
8. The method according to claim 1, wherein the modifier is an alkoxysilane-based modifier.
9. The method according to claim 1, wherein the modifier is injected into a modification reactor performing step (S2), or the modifier is injected into a transporting part transporting the active polymer prepared in the polymerization step (S1) to the modification reactor performing step (S2).
10. The method according to claim 1, wherein the modifier is one or more selected from the group consisting of compounds represented by the following Formula 1 to Formula 6:

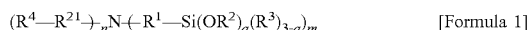  [Formula 1]

in Formula 1,
$R^1$ is a single bond, or an alkylene group of 1 to 10 carbon atoms,
$R^2$ and $R^3$ are each independently an alkyl group of 1 to 10 carbon atoms,
$R^4$ is hydrogen, an alkyl group of 1 to 10 carbon atoms, a divalent, trivalent or tetravalent alkylsilyl group which is substituted with an alkyl group of 1 to 10 carbon atoms, or a heterocyclic group of 2 to 10 carbon atoms, $R^{21}$ is a single bond, an alkylene group of 1 to 10 carbon atoms, or —[$R^{42}$O]$_j$—, where $R^{42}$ is an alkylene group of 1 to 10 carbon atoms, and
a and m are each independently an integer of 1 to 3, n is an integer of 0 to 3, and j is an integer of 1 to 30;

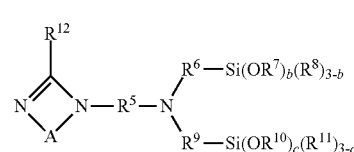  [Formula 2]

in Formula 2,
$R^5$, $R^6$ and $R^9$ are each independently an alkylene group of 1 to 10 carbon atoms,
$R^7$, $R^8$, $R^{10}$ and $R^{11}$ are each independently an alkyl group of 1 to 10 carbon atoms,
$R^{12}$ is hydrogen or an alkyl group of 1 to 10 carbon atoms,
b and c are each independently an integer of 0 to 3, where b+c≥1,
A is

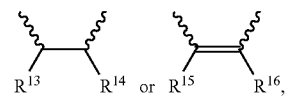

where $R^{13}$, $R^{14}$, $R^{15}$ and $R^{16}$ are each independently hydrogen or an alkyl group of 1 to 10 carbon atoms;

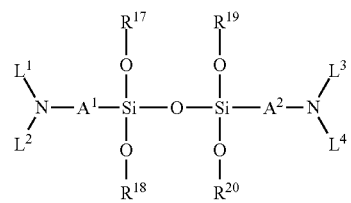  [Formula 3]

in Formula 3,
$A^1$ and $A^2$ are each independently a divalent hydrocarbon group of 1 to 20 carbon atoms, which includes or does not include an oxygen atom,
$R^{17}$ to $R^{20}$ are each independently a monovalent hydrocarbon group of 1 to 20 carbon atoms,
$L^1$ to $L^4$ are each independently a divalent, trivalent or tetravalent alkylsilyl group which is substituted with an alkyl group of 1 to 10 carbon atoms, or
$L^1$ to $L^4$ are each independently a monovalent hydrocarbon group of 1 to 20 carbon atoms, or
$L^1$ and $L^2$, and $L^3$ and $L^4$ are connected with each other to form a ring of 1 to 5 carbon atoms, wherein the formed ring includes 1 to 3 atoms of one or more heteroatoms selected from the group consisting of N, O and S;

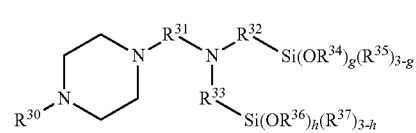  [Formula 4]

in Formula 4,

R$^{30}$ is a monovalent hydrocarbon group of 1 to 30 carbon atoms,

R$^{31}$ to R$^{33}$ are each independently an alkylene group of 1 to 10 carbon atoms, R$^{34}$ to R$^{37}$ are each independently an alkyl group of 1 to 10 carbon atoms, and g and h are each independently 0, or an integer selected from 1 to 3, where g+h is an integer of 1 or more;

[Formula 5]

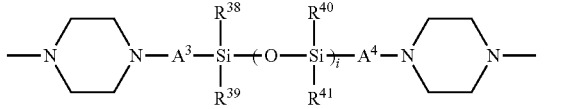

in Formula 5,

A$^3$ and A$^4$ are each independently an alkylene group of 1 to 10 carbon atoms, R$^{38}$ to R$^{41}$ are each independently an alkyl group of 1 to 10 carbon atoms, or an alkoxy group of 1 to 10 carbon atoms, and i is an integer of 1 to 30;

$(R^{43})_{4-k}Sn(-S-R^{44}-Si(OR^{45})_j(R^{46})_{3-j})_k$     [Formula 6]

in Formula 6,

R$^{43}$, R$^{45}$ and R$^{46}$ are each independently an alkyl group of 1 to 10 carbon atoms, R$^{44}$ is an alkylene group of 1 to 10 carbon atoms, and k is an integer of 1 to 4.

11. The method according to claim 1, wherein the modifier is a compound represented by the following Formula 7:

[Formula 7]

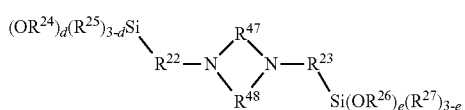

in Formula 7,

R$^{22}$ and R$^{23}$ are each independently an alkylene group of 1 to 20 carbon atoms, or —R$^{28}$[OR$^{29}$]$_f$—, R$^{24}$ to R$^{27}$ are each independently an alkyl group of 1 to 20 carbon atoms or an aryl group of 6 to 20 carbon atoms, R$^{28}$ and R$^{29}$ are each independently an alkylene group of 1 to 20 carbon atoms, R$^{47}$ and R$^{48}$ are each independently a divalent hydrocarbon group of 1 to 6 carbon atoms, d and e are each independently 0, or an integer selected from 1 to 3, where d+e is an integer of 1 or more, and f is an integer of 1 to 30.

12. The method according to claim 11, wherein the compound represented by Formula 7 is a compound represented by the following Formula 7a, Formula 7b or Formula 7c:

[Formula 7a]

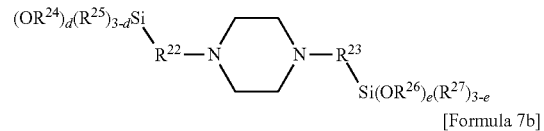

[Formula 7b]

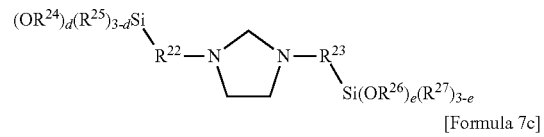

[Formula 7c]

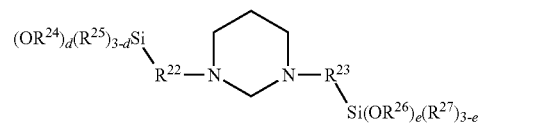

in Formula 7a, Formula 7b, and Formula 7c,

R$^{22}$ and R$^{23}$ are each independently an alkylene group of 1 to 20 carbon atoms, or —R$^{28}$[OR$^{29}$]$_f$—, R$^{24}$ to R$^{27}$ are each independently an alkyl group of 1 to 20 carbon atoms or an aryl group of 6 to 20 carbon atoms, R$^{28}$ and R$^{29}$ are each independently an alkylene group of 1 to 20 carbon atoms, d and e are each independently 0, or an integer selected from 1 to 3, where d+e is an integer of 1 or more, and f is an integer of 1 to 30.

13. The method according to claim 1, wherein the conjugated diene-based monomer is one or more selected from the group consisting of 1,3-butadiene, 2,3-dimethyl-1,3-butadiene, piperylene, 3-butyl-1,3-octadiene, isoprene, 2-phenyl-2,3-butadiene and 2-halo-1,3-butadiene, wherein halo is a halogen atom.

14. The method according to claim 1, wherein the organometal compound is present in an amount of from 0.01 mmol to 10 mmol based on 100 g of the conjugated diene-based monomer.

15. The method according to claim 1, wherein the polymerization conversion ratio in the first polymerization reactor is from 10% to 50%.

16. The method according to claim 2, wherein the polymerization step (S1) is performed at a temperature of 0° C. to 80° C.

17. The method according to claim 6, wherein the polar additive is one or more selected from the group consisting of tetrahydrofuran, 2,2-di(2-tetrahydrofuryl)propane, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium metholate, and 2-ethyl tetrahydrofufuryl ether.

18. The method according to claim 1, wherein the polymerization step (S1) is a living anionic polymerization.

19. The method according to claim 1 further comprising, injecting a second conjugated diene-based monomer to the active polymer prepared by the polymerization step (S1) prior to the reacting step (S2).

* * * * *